(12) United States Patent
Endo et al.

(10) Patent No.: US 12,546,248 B2
(45) Date of Patent: Feb. 10, 2026

(54) HYDROGEN ENGINE

(71) Applicant: MITSUBISHI HEAVY INDUSTRIES ENGINE & TURBOCHARGER, LTD., Sagamihara (JP)

(72) Inventors: Hiroyuki Endo, Sagamihara (JP); Masaki Toda, Sagamihara (JP); Sota Watanabe, Sagamihara (JP); Tomohiro Noguchi, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 18/856,359

(22) PCT Filed: Apr. 13, 2023

(86) PCT No.: PCT/JP2023/014956
§ 371 (c)(1),
(2) Date: Oct. 11, 2024

(87) PCT Pub. No.: WO2023/210386
PCT Pub. Date: Nov. 2, 2023

(65) Prior Publication Data
US 2025/0257684 A1 Aug. 14, 2025

(30) Foreign Application Priority Data
Apr. 25, 2022 (JP) .................................. 2022-071572

(51) Int. Cl.
*F02B 43/04* (2006.01)
*F01L 1/18* (2006.01)
(Continued)

(52) U.S. Cl.
CPC .............. *F02B 43/04* (2013.01); *F01L 1/181* (2013.01); *F02B 1/08* (2013.01); *F02D 19/024* (2013.01);
(Continued)

(58) Field of Classification Search
CPC ........ F02B 43/04; F02B 1/08; F02B 2201/04; F02B 2275/14; F01L 1/181;
(Continued)

(56) References Cited

U.S. PATENT DOCUMENTS

| | | | |
|---|---|---|---|
| 5,060,610 A * | 10/1991 | Paro | F02B 43/00 123/305 |
| 2009/0012698 A1 * | 1/2009 | Shinagawa | F02B 23/0672 123/575 |

FOREIGN PATENT DOCUMENTS

| | | | |
|---|---|---|---|
| CN | 112761780 A | 5/2021 | |
| FR | 2672638 A1 * | 8/1992 | .............. F02B 19/04 |

(Continued)

OTHER PUBLICATIONS

The International Search Report (PCT/ISA/210) issued in PCT/JP2023/014956, mailed on Jun. 27, 2023.
(Continued)

*Primary Examiner* — Hung Q Nguyen
(74) *Attorney, Agent, or Firm* — Birch, Stewart, Kolasch & Birch, LLP

(57) ABSTRACT

A hydrogen engine using fuel gas containing hydrogen, including: a cylinder; a piston movable within the cylinder; a cylinder head forming a combustion chamber with the piston, and including an intake port connected to the combustion chamber and a fuel supply port connected to the combustion chamber; an intake valve for opening and closing the intake port; a fuel supply valve for opening and closing the fuel supply port; and a valve train commonly (Continued)

provided for the intake valve and the fuel supply valve, and configured to open and close the intake valve and the fuel supply valve in conjunction with each other. The hydrogen engine is configured such that a valve opening timing of the fuel supply valve is more retarded than a valve opening timing of the intake valve.

14 Claims, 18 Drawing Sheets

(51) Int. Cl.
*F02B 1/08* (2006.01)
*F02D 19/02* (2006.01)
(52) U.S. Cl.
CPC ....... *F02B 2201/04* (2013.01); *F02B 2275/14* (2013.01)
(58) Field of Classification Search
CPC ......... F01L 2820/02; F01L 1/146; F01L 3/20; F02D 19/024; F02D 41/401; F02M 21/0206; F02M 21/0233; Y02T 10/30
See application file for complete search history.

(56) References Cited

FOREIGN PATENT DOCUMENTS

| JP | 63-124854 A | | 5/1988 |
| JP | 63-129156 A | | 6/1988 |
| JP | 5-60038 A | | 3/1993 |
| JP | 8-61103 A | | 3/1996 |
| JP | 2007182856 A | * | 7/2007 |
| JP | 2007-198273 A | | 8/2007 |
| JP | 2016-118109 A | | 6/2016 |
| JP | 2022-44553 A | | 3/2022 |
| JP | 2024170902 A | * | 12/2024 |

OTHER PUBLICATIONS

Japanese Office Action for Japanese Application No. 2022-071572, dated Jul. 22, 2025, with English translation.

* cited by examiner

HYDROGEN ENGINE

TECHNICAL FIELD

The present disclosure relates to a hydrogen engine.

This application claims the priority of Japanese Patent Application No. 2022-071572 filed on Apr. 25, 2022, the content of which is incorporated herein by reference.

BACKGROUND

Patent Document 1 discloses a hydrogen engine that uses hydrogen fuel. In this hydrogen engine, an injector for injecting the hydrogen fuel into an intake port is provided, and intake air flowing in the intake port and the hydrogen fuel injected from the injector are mixed and supplied to a combustion chamber.

CITATION LIST

Patent Literature

Patent Document 1: JP2016-118109A

SUMMARY

Technical Problem

Since hydrogen has a wide combustible range and a fast combustion speed, when the hydrogen fuel is injected into the intake port as described in Patent Document 1, backfire is likely to occur in which a flame travels back to the intake port, and there is a risk of damage to an intake path. In order to suppress such backfire, a method for providing a fuel supply port separately from the intake port and supplying fuel gas to the combustion chamber without via the intake port is conceivable. However, since there is a period of overlap between an intake valve opening period and an exhaust valve opening period, if a part of the fuel gas supplied from the fuel supply port to the combustion chamber is discharged from the exhaust port without being burned, engine efficiency will be decreased.

In view of the above, an object of at least one embodiment of the present disclosure is to provide a hydrogen engine that can suppress the occurrence of the backfire and can achieve high engine efficiency.

Solution to Problem

In order to achieve the above-described object, a hydrogen engine according to at least one embodiment of the present disclosure is a hydrogen engine using fuel gas containing hydrogen, including: a cylinder; a piston movable within the cylinder; a cylinder head forming a combustion chamber with the piston, and including an intake port connected to the combustion chamber and a fuel supply port connected to the combustion chamber; an intake valve for opening and closing the intake port; a fuel supply valve for opening and closing the fuel supply port; and a valve train commonly provided for the intake valve and the fuel supply valve, and configured to open and close the intake valve and the fuel supply valve in conjunction with each other. The hydrogen engine is configured such that a valve opening timing of the fuel supply valve is more retarded than a valve opening timing of the intake valve.

In order to achieve the above-described object, a hydrogen engine according to at least one embodiment of the present disclosure is a hydrogen engine using fuel gas containing hydrogen, including: a cylinder; a piston movable within the cylinder; a cylinder head forming a combustion chamber with the piston, and including an intake port connected to the combustion chamber, a fuel supply port connected to the combustion chamber, and an exhaust port connected to the combustion chamber; an intake valve for opening and closing the intake port; a fuel supply valve for opening and closing the fuel supply port; a valve train commonly provided for the intake valve and the fuel supply valve, and configured to open and close the intake valve and the fuel supply valve in conjunction with each other; and a cover portion configured to cover at least a part of an outlet portion of the fuel supply port on a side of the exhaust port in at least a part of a valve opening period of the fuel supply valve.

In order to achieve the above-described object, a hydrogen engine according to at least one embodiment of the present disclosure is a hydrogen engine using fuel gas containing hydrogen, including: a cylinder; a piston movable within the cylinder; a cylinder head forming a combustion chamber with the piston, and including an intake port connected to the combustion chamber, a fuel supply port connected to the combustion chamber, and an exhaust port connected to the combustion chamber; an intake valve for opening and closing the intake port; a fuel supply valve for opening and closing the fuel supply port; and a valve train commonly provided for the intake valve and the fuel supply valve, and configured to open and close the intake valve and the fuel supply valve in conjunction with each other. A lower surface of the cylinder head is formed along a plane. A lower surface of the fuel supply valve is located upstream of a flow of the fuel gas in an axial direction of the fuel supply valve relative to the lower surface of the cylinder head, in a state in which the fuel supply valve abuts against a valve seat surface disposed in the fuel supply port.

Advantageous Effects

According to at least one embodiment of the present disclosure, a hydrogen engine is provided which can suppress the occurrence of backfire and can achieve high engine efficiency.

DETAILED DESCRIPTION

Figure 1:
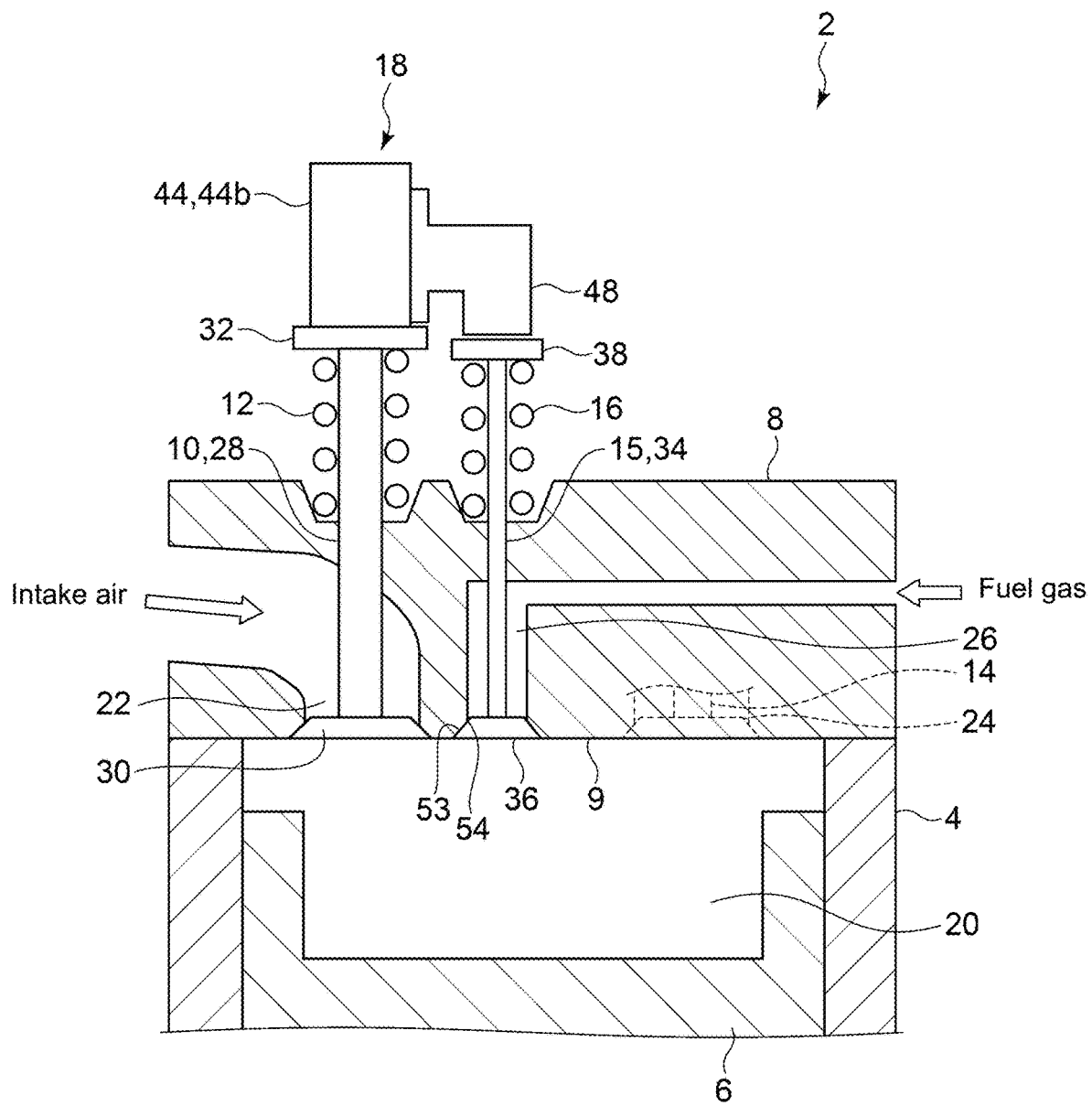
FIG. 1 is a schematic cross-sectional view of a hydrogen engine 2 according to an embodiment.

Some embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

Hydrogen Engine

FIG. 1 is a schematic cross-sectional view of a hydrogen engine 2 according to an embodiment. Hereinafter, the hydrogen engine 2 will be described taking as an example a four-stroke engine that uses fuel gas containing hydrogen.

The hydrogen concentration of the fuel gas used by the hydrogen engine 2 may be, for example, at least 50%, at least 75%, or at least 99%.

As shown in FIG. 1, the hydrogen engine 2 includes a cylinder 4, a piston 6, a cylinder head 8, an intake valve 10, a valve spring 12, an exhaust valve 14, a fuel supply valve 15, a valve spring 16, and a valve train 18.

The piston 6 is configured to be movable within the cylinder 4. The piston 6 reciprocates within the cylinder 4 such that an outer peripheral surface of the piston 6 slides on an inner peripheral surface of the cylinder 4, and a crankshaft (not shown) connected to the piston 6 rotates in conjunction with the reciprocation of the piston 6.

The cylinder head 8 forms a combustion chamber 20 with the piston 6. The cylinder head 8 includes an intake port 22 connected to the combustion chamber 20, an exhaust port 24 connected to the combustion chamber 20, and a fuel supply port 26 connected to the combustion chamber 20. In the illustrated example, a lower surface 9 of the cylinder head 8 is formed along a plane orthogonal to the axial direction of the piston 6.

The intake valve 10 is configured to open and close the intake port 22. The intake valve 10 includes a valve stem 28, a valve body portion 30 disposed on one end side of the valve stem 28, and a force receiving portion 32 disposed on another end side of the valve stem 28. In the illustrated example, the valve stem 28 extends in an up-down direction, the valve body portion 30 is disposed at a lower end of the valve stem 28, and the force receiving portion 32 is disposed at an upper end of the valve stem 28. Further, in the illustrated example, the valve body portion 30 is formed in a truncated cone shape such that an outer diameter of the valve body portion 30 decreases toward an upstream side of an intake air flow, and an inclined surface (an inclined surface inclined with respect to the axial direction of the intake valve 10) of the truncated cone shape is disposed to be abuttable against a valve seat surface of the intake port 22 in the axial direction of the intake valve 10 (the axial direction of the valve stem 28). Furthermore, in the illustrated example, the force receiving portion 32 is formed in a plate shape along the plane orthogonal to the axial direction of the intake valve 10.

The valve spring 12 is interposed in a compressed state between an upper surface of the cylinder head 8 and a lower surface of the force receiving portion 32, and biases the force receiving portion 32 upward to bias the intake valve 10 in a closing direction.

The exhaust valve 14 is configured to open and close the exhaust port 24. The exhaust valve 14 has a structure similar to that of the intake valve 10, and a valve spring (not shown) biases the exhaust valve 14 in a closing direction.

The fuel supply valve 15 is configured to open and close the fuel supply port 26. The fuel supply valve 15 includes a valve stem 34, a valve body portion 36 disposed on one end side of the valve stem 34, and a force receiving portion 38 disposed on another end side of the valve stem 34. In the illustrated example, the valve stem 34 extends in the up-down direction, the valve body portion 36 is disposed at a lower end of the valve stem 34, and the force receiving portion 38 is disposed at an upper end of the valve stem 34. Further, in the illustrated example, the valve body portion 36 is formed in a truncated cone shape such that an outer diameter of the valve body portion 36 decreases toward an upstream side of a fuel gas flow, and an inclined surface 53 (an inclined surface inclined with respect to the axial direction of the fuel supply valve 15) of the truncated cone shape is disposed to be abuttable against a valve seat surface 54 of the fuel supply port 26 in the axial direction of the fuel supply valve 15 (the axial direction of the valve stem 34). Furthermore, in the illustrated example, the force receiving portion 38 is formed in a plate shape along a plane orthogonal to the axial direction of the fuel supply valve 15.

The valve spring 16 is interposed in a compressed state between the upper surface of the cylinder head 8 and a lower surface of the force receiving portion 38, and biases the force receiving portion 38 upward to bias the fuel supply valve 15 in a closing direction.

The valve train 18 is commonly provided for the intake valve 10 and the fuel supply valve 15, and is configured to open and close the intake valve 10 and the fuel supply valve 15 in conjunction with each other. An example of the detailed configuration of the valve train 18 will be described later.

In the above-described hydrogen engine 2, the fuel gas supplied from the fuel supply port 26 and air supplied from the intake port 22 are mixed in the combustion chamber 20 and ignited by an ignition device (not shown) to burn a combustion gas. In the above configuration, the fuel supply port 26 is disposed separately from the intake port 22, and the fuel gas containing hydrogen is supplied to the combustion chamber 20 from the fuel supply port 26 without via the intake port 22. Therefore, it is possible to suppress the occurrence of backfire in which a flame travels back to the intake port 22.

Valve Train

Figure 2:
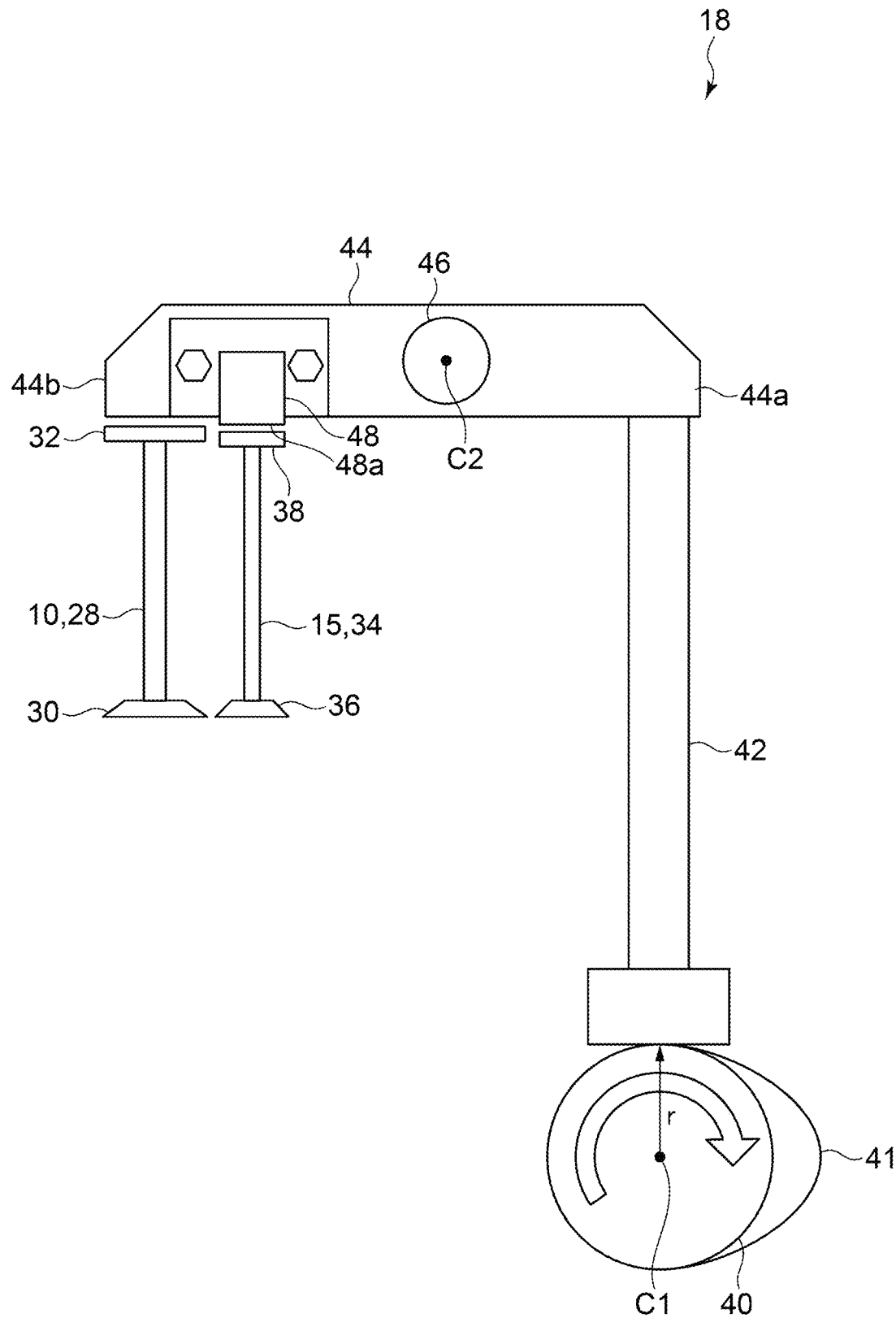
FIG. 2 is a side view showing an example of a detailed configuration of a valve train 18.

FIG. 2 is a side view showing an example of the detailed configuration of the valve train 18.

As shown in FIG. 2, the valve train 18 includes an intake camshaft 40, an intake cam 41, a push rod 42, an intake rocker arm 44, a rocker arm shaft 46, and a fuel supply valve arm 48.

The intake cam 41 is formed integrally with the intake camshaft 40 in the intake camshaft 40. The intake camshaft 40 rotates together with the intake cam 41 in conjunction with a rotation of a crankshaft (not shown) of the hydrogen engine 2. A lower end portion of the push rod 42 abuts against an outer peripheral surface (cam surface) of the intake cam 41, and as the intake cam 41 rotates, a distance r between the push rod 42 and a rotational axis C1 of the intake cam 41 changes, causing the push rod 42 to reciprocate in the axial direction of the push rod 42.

The intake rocker arm 44 is supported by the rocker arm shaft 46 so as to be rotatable around a central axis C2 of the rocker arm shaft 46 (a rotational axis of the intake rocker arm 44). A lower surface in one end portion 44a of the intake rocker arm 44 abuts against an upper end portion of the push rod 42. As the push rod 42 reciprocates in the axial direction of the push rod 42 in response to the rotation of the intake cam 41, the upper end portion of the push rod 42 presses the lower surface in the one end portion 44a of the intake rocker arm 44, causing the intake rocker arm 44 to rotate (swing) around the above-described rotational axis C2.

A lower surface in another end portion 44b of the intake rocker arm 44 can press the intake valve 10 when the intake rocker arm 44 rotates. The rotation of the intake rocker arm 44 causes the lower surface in the another end portion 44b of the intake rocker arm 44 to push the intake valve 10 down against a biasing force of the valve spring 12 (see FIG. 1), causing the intake valve 10 to move in an open direction. Further, the rotation of the intake rocker arm 44 displaces the another end portion 44b of the intake rocker arm 44 in a direction of the biasing force of the valve spring 12, causing the intake valve 10 to move in the closing direction.

The fuel supply valve arm 48 is connected to an another end portion 44b side of the intake rocker arm 44, and rotates around the rotational axis C2 together with the intake rocker arm 44. Since the fuel supply valve arm 48 rotates around the rotational axis C2, a tip portion 48a of the fuel supply valve arm 48 can press the fuel supply valve 15.

The rotation of the intake rocker arm 44 causes the tip portion 48a of the fuel supply valve arm 48 to push the fuel supply valve 15 down against a biasing force of the valve spring 16 (see FIG. 1), causing the fuel supply valve 15 to move in the open direction. Further, the rotation of the intake rocker arm 44 displaces the tip portion 48a of the fuel supply valve arm 48 in a direction of the biasing force of the valve spring 16, causing the fuel supply valve 15 to move in the closing direction.

Fuel Supply Valve and its Surrounding Configuration

Figure 3:
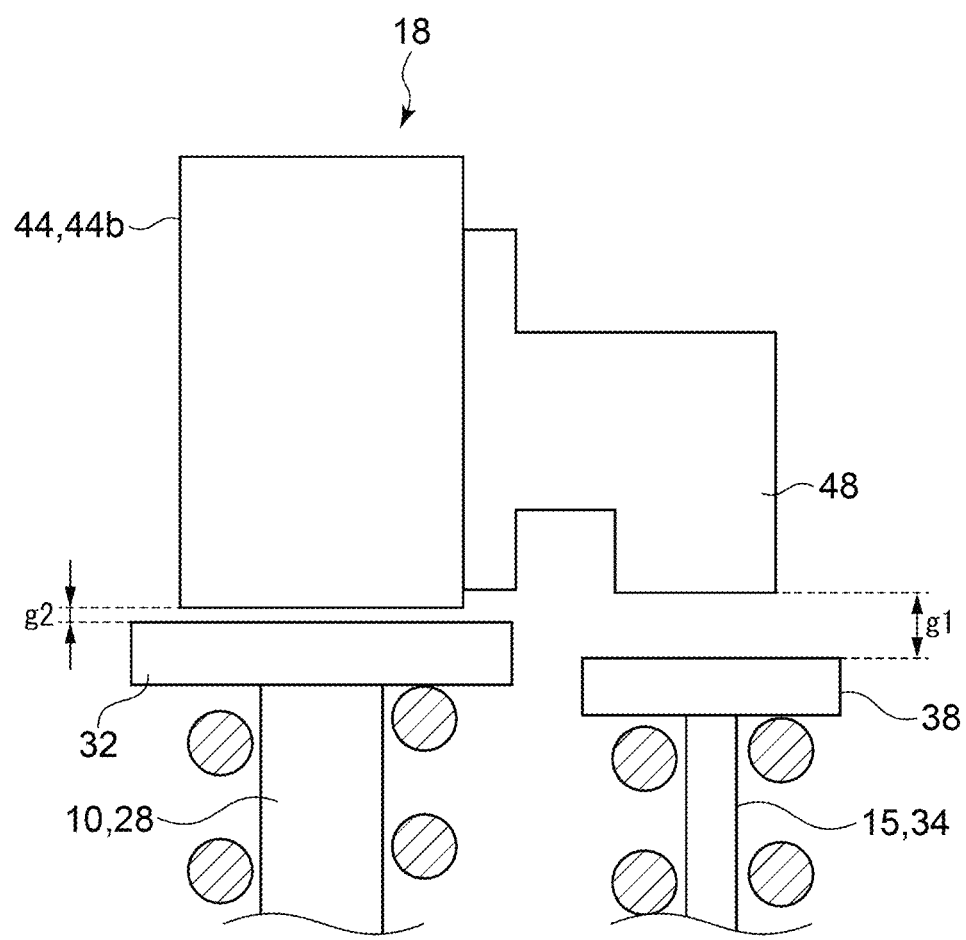
FIG. 3 is an enlarged view showing an example of the configuration in the vicinity of another end portion 44b of an intake rocker arm 44 shown in FIGS. 1 and 2.
Figure 4:
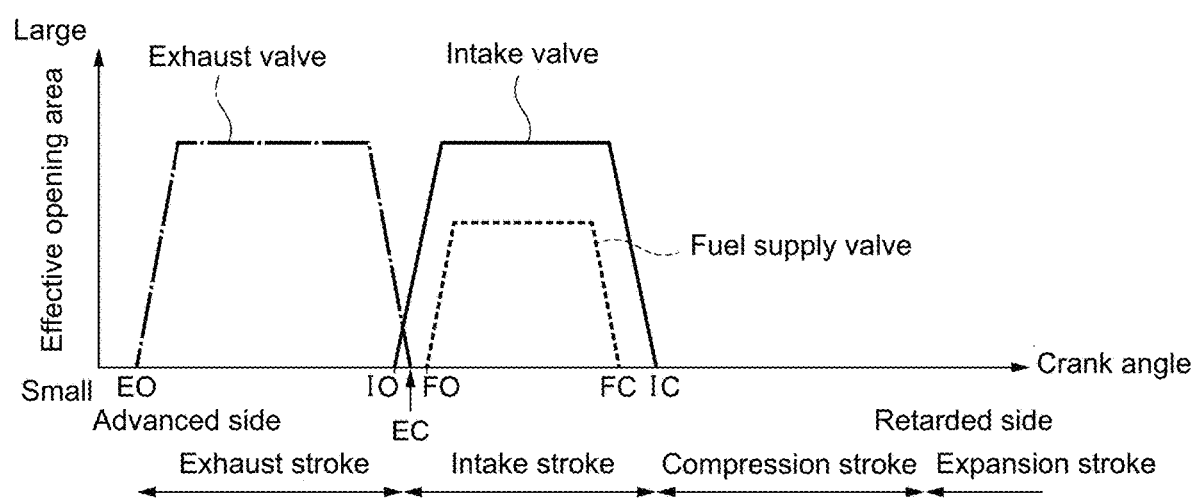
FIG. 4 is a chart showing an example of changes in respective effective opening areas of an intake valve 10, an exhaust valve 14, and a fuel supply valve 15 in one combustion cycle of the hydrogen engine 2.

FIG. 3 is an enlarged view showing an example of the configuration in the vicinity of the another end portion 44b of the intake rocker arm 44 shown in FIGS. 1 and 2. FIG. 4 is a chart showing an example of changes in respective effective opening areas of the intake valve 10, the exhaust valve 14, and the fuel supply valve 15 in one combustion cycle of the hydrogen engine 2.

In some embodiments, for example as shown in FIG. 3, where g1 is a distance between the fuel supply valve arm 48 and the fuel supply valve 15 and g2 is a distance between the intake rocker arm 44 and the intake valve 10, a maximum value g1max of the distance g1 in the one combustion cycle of the hydrogen engine 2 may be greater than a maximum value g2max of the distance g2 in the one combustion cycle of the hydrogen engine 2. For example, in the configuration shown in FIG. 2, when the distance r between the rotation center C1 of the intake cam 41 and the push rod 42 is at its minimum value during one rotation of the intake cam 41, the distance g1 between the fuel supply valve arm 48 and the fuel supply valve 15 and the distance g2 between the intake rocker arm 44 and the intake valve 10 are at the maximum value g1max and the maximum value g2max, respectively (that is, the intake valve 10 and the fuel supply valve 15 are at their valve closing positions, respectively), and the maximum value g1max is greater than the maximum value g2max.

As a result, as shown in FIG. 4, in an intake stroke of the hydrogen engine 2, a valve opening timing FO of the fuel supply valve 15 is more retarded than a valve opening timing IO of the intake valve 10. In FIG. 4, a dotted and dashed line indicates the effective opening area of the exhaust valve 14 (a throat area corresponding to a position of the exhaust valve 14 in the exhaust port 24), a solid line indicates the effective opening area of the intake valve 10 (a throat area corresponding to a position of the intake valve 10 in the intake port 22), and a dashed line indicates the effective opening area of the fuel supply valve 15 (a throat area corresponding to a position of the fuel supply valve 15 in the fuel supply port 26). In FIG. 4, EO indicates a valve opening timing of the exhaust valve 14, EC indicates a valve closing timing of the exhaust valve 14, FC indicates a valve closing timing of the fuel supply valve 15, and IC indicates a valve closing timing of the intake valve 10. Further, in the present specification, the "valve opening timing" means a timing at which the valve starts to open (a timing at which the effective opening area starts to increase from 0), and the "valve closing timing" means a timing at which the valve closes (a timing at which the effective opening area becomes 0).

Further, in the configuration shown in FIG. 3, the distance g1 between the fuel supply valve arm 48 and the fuel supply valve 15 may be greater than 0 at the valve closing timing EC of the exhaust valve 14 in an exhaust stroke of the hydrogen engine 2 (see FIG. 4).

According to the above-described hydrogen engine 2, the fuel supply port 26 is disposed separately from the intake port 22, and the fuel gas containing hydrogen is supplied to the combustion chamber 20 from the fuel supply port 26 without via the intake port 22. Therefore, it is possible to suppress the occurrence of backfire in which a flame travels back to the intake port 22.

Further, since the maximum value g1max of the distance g1 in the one combustion cycle of the hydrogen engine 2 is greater than the maximum value g2max of the distance g2 in said one combustion cycle of the hydrogen engine 2, the valve opening timing FO of the fuel supply valve 15 can be more retarded than the valve opening timing IO of the intake valve 10. Therefore, even if there is a period of overlap between a valve opening period of the intake valve 10 and a valve opening period of the exhaust valve 14 (a period from the valve opening timing IO of the intake valve 10 to the valve closing timing EC of the exhaust valve 14 in FIG. 4), it is possible to suppress discharge of a part of the fuel gas supplied from the fuel supply port 26 to the combustion chamber 20 from the exhaust port 24 without being burned. Thus, it is possible to suppress a decrease in engine efficiency, and to implement the highly efficient hydrogen engine 2. Further, since the distance g1 between the fuel supply valve arm 48 and the fuel supply valve 15 at the valve closing timing EC of the exhaust valve 14 is greater than 0, the valve opening timing FO of the fuel supply valve 15 can be more retarded than the valve closing timing EC of the exhaust valve 14. Therefore, it is possible to effectively suppress discharge of a part of the fuel gas supplied from the fuel supply port 26 to the combustion chamber 20 from the exhaust port 24 without being burned.

Figure 5A:
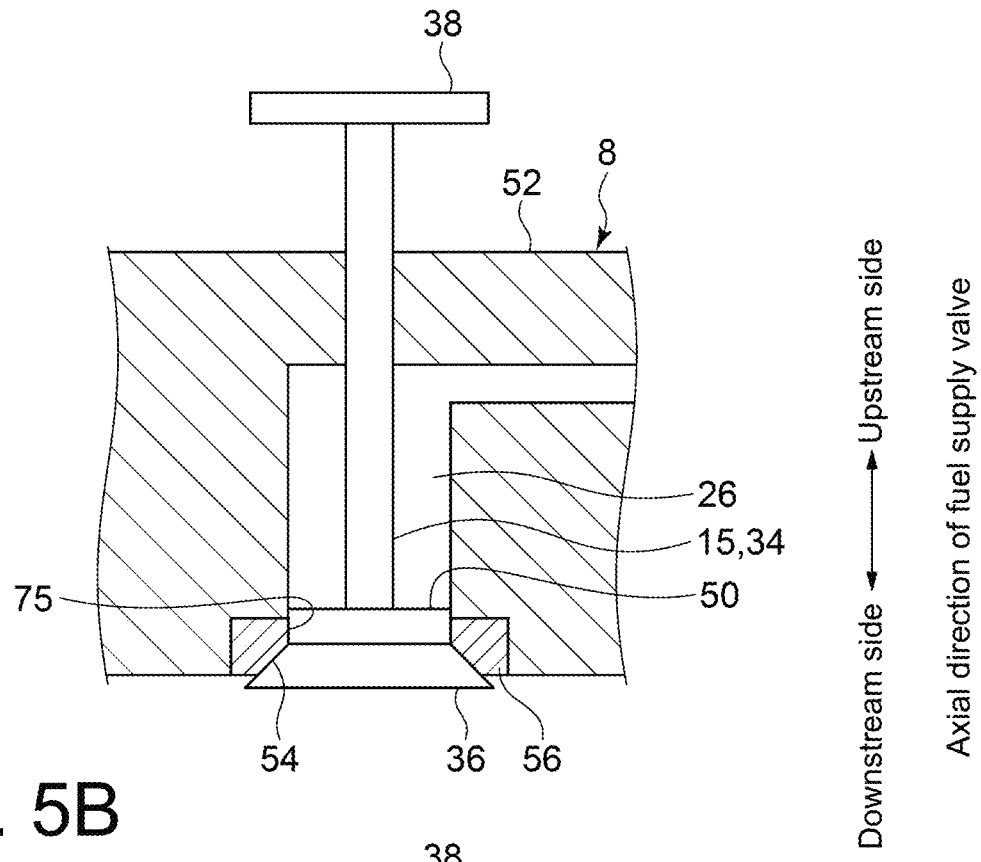
FIG. 5A is a view for describing an example of a detailed configuration of the fuel supply valve 15 shown in FIGS. 1 and 2, and shows a state in which a valve body portion 36 of the fuel supply valve 15 abuts against a valve seat surface 54 of a fuel supply port 26 and the fuel supply port 26 is closed.
Figure 5B:
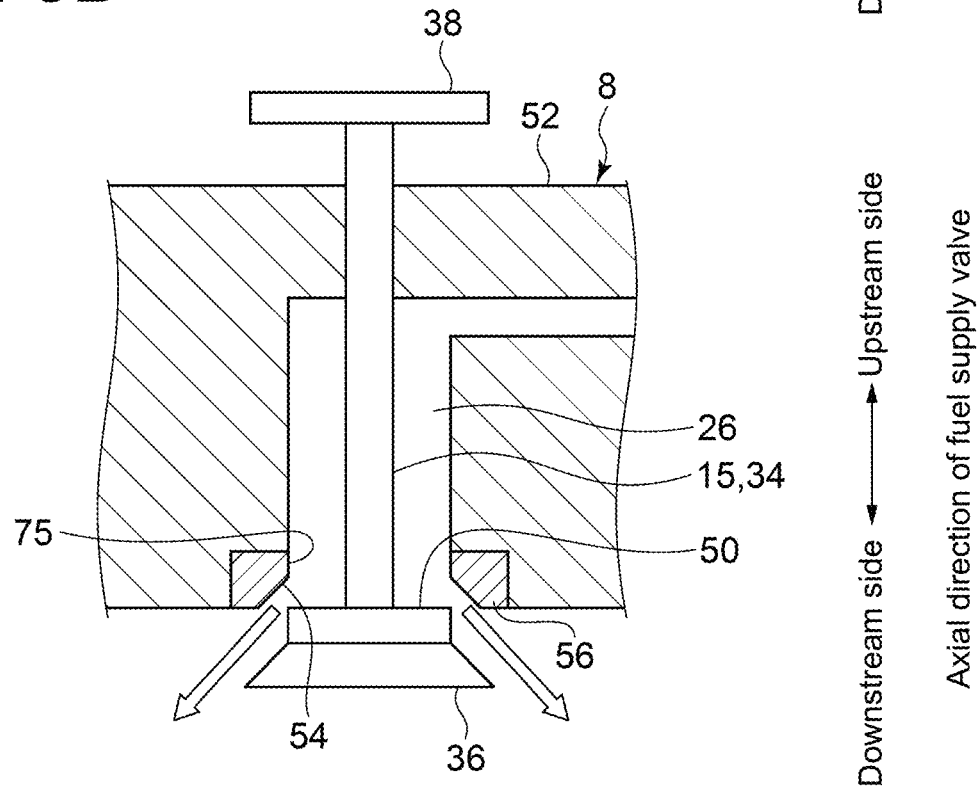
FIG. 5B is a view for describing an example of the detailed configuration of the fuel supply valve 15 shown in FIGS. 1 and 2, and shows a state in which the valve body portion 36 of the fuel supply valve 15 is separated from the valve seat surface 54 of the fuel supply port 26 and the fuel supply port 26 is open.
Figure 5C:
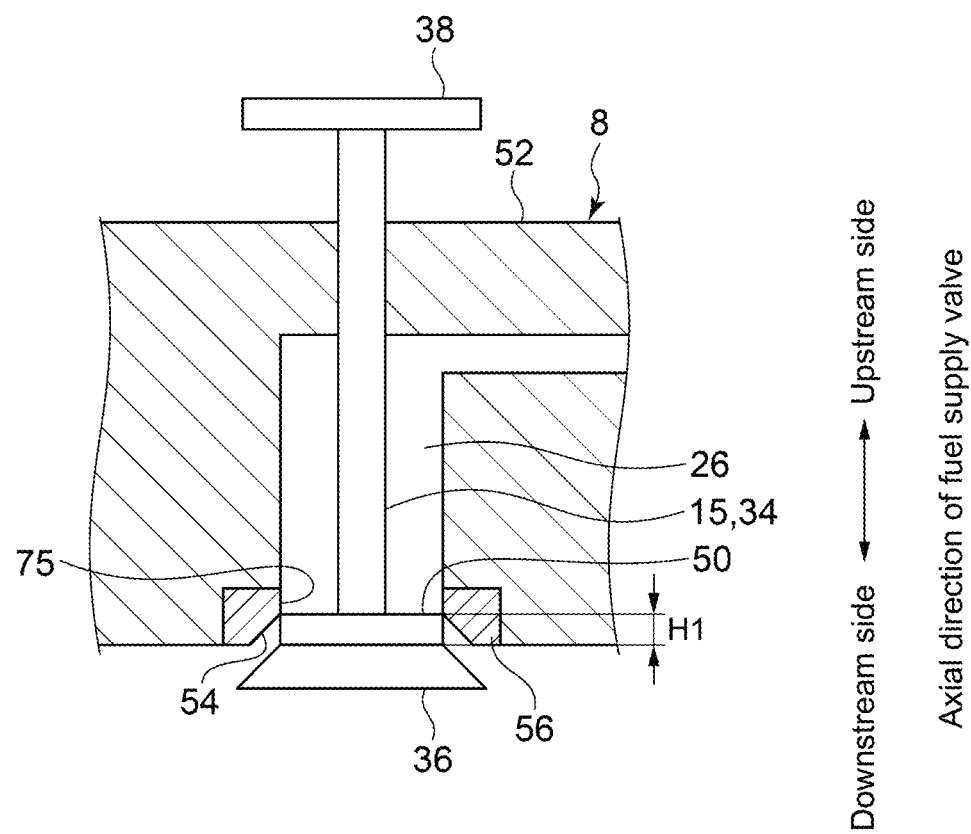
FIG. 5C is a view for describing an example of the detailed configuration of the fuel supply valve 15 shown in FIGS. 1 and 2, and shows a state in which the valve body portion 36 of the fuel supply valve 15 is separated from the valve seat surface 54 and the fuel supply port 26 is closed by a collar portion 50 of the fuel supply valve 15 (a state between the state shown in FIG. 5A and the state shown in FIG. 5B).

Each of FIGS. 5A to 5C is a view for describing an example of the detailed configuration of the fuel supply valve 15 shown in FIGS. 1 and 2. FIG. 5A shows a state in which the valve body portion 36 of the fuel supply valve 15 abuts against the valve seat surface 54 of the fuel supply port 26 and the fuel supply port 26 is closed. FIG. 5B shows a state in which the valve body portion 36 of the fuel supply valve 15 is separated from the valve seat surface 54 of the fuel supply port 26 and the fuel supply port 26 is open. FIG. 5C shows a state in which the valve body portion 36 of the fuel supply valve 15 is separated from the valve seat surface 54 and the fuel supply port 26 is closed by a collar portion 50 of the fuel supply valve 15 (a state between the state shown in FIG. 5A and the state shown in FIG. 5B).

In the examples shown in FIGS. 5A to 5C, the fuel supply valve 15 includes the collar portion 50 in addition to the valve stem 34, the valve body portion 36, and the force receiving portion 38 which are described above. Further, the cylinder head 8 includes a cylinder head body 52, and an annular valve seat member 56 forming the annular valve seat surface 54 of the fuel supply port 26 and configured separately from the cylinder head body 52.

In the illustrated examples, the collar portion 50 is disposed adjacent to the valve body portion 36 between the valve stem 34 and the valve body portion 36 (an upper end of the valve body portion 36), and is formed in a disk or columnar shape. An outer diameter of the collar portion 50 is greater than an outer diameter of the valve stem 34 and approximately coincides with a flow passage width of the fuel supply port 26, that is, an inner diameter of the annular valve seat member 56. The outer diameter of the collar portion 50 is set such that an outer peripheral surface of the collar portion 50 can slide on a flow passage wall 75 of the fuel supply port 26 (an inner peripheral surface of the valve seat member 56 in the illustrated examples). Further, in the state in which the valve body portion 36 abuts against the valve seat surface 54 of the fuel supply port 26 in the axial direction of the fuel supply valve 15 (see FIG. 5A), the collar portion 50 is located upstream of a fuel gas flow in the axial direction of the fuel supply valve 15 relative to the valve seat surface 54.

Figure 6:
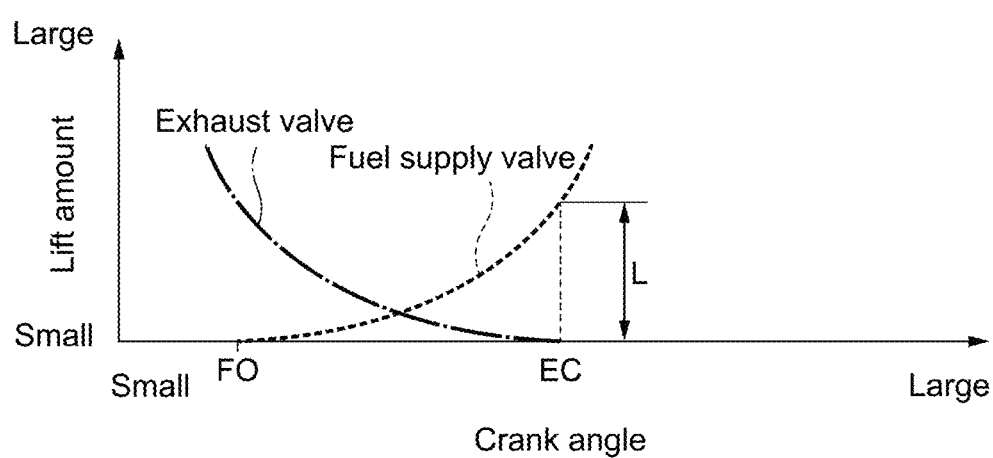
FIG. 6 is a graph showing a relationship between a crank angle of the hydrogen engine 2 and a lift amount of each of the exhaust valve 14 and the fuel supply valve 15.

Herein, the collar portion 50 is configured to satisfy $H1>0.7\times L$, where H1 is a height of the collar portion 50 in the axial direction of the fuel supply valve 15 as shown in FIG. 5C and L1 is a lift amount of the fuel supply valve 15 at the valve closing timing EC of the exhaust valve 14 in the exhaust stroke of the hydrogen engine 2 (see FIG. 4) as shown in FIG. 6. Further, more preferably, the collar portion 50 is configured to satisfy $H1>L$. In FIG. 6, the horizontal axis represents a crank angle of the hydrogen engine 2, and the vertical axis means a lift amount of each of the exhaust valve 14 and the fuel supply valve 15. Further, the above-described lift amount L shown in FIG. 6 means a distance between the valve seat surface 54 and the valve body portion 36 of the fuel supply valve 15 at the valve closing timing EC of the exhaust valve 14 in the exhaust stroke of the hydrogen engine 2 (see FIG. 4).

According to the configuration including the above-described collar portion 50, as shown in FIG. 5C, even if the valve body portion 36 is separated from the valve seat surface 54, it is possible to maintain the state in which the fuel supply port 26 is closed or the state in which the opening area of the fuel supply port 26 is small as long as the outer peripheral surface of the collar portion 50 abuts against the flow passage wall 75 of the fuel supply port 26. Therefore, the fuel gas is not supplied to the combustion chamber 20 at an initial stage of the lift of the fuel supply valve 15. Whereby, the valve opening timing FO of the fuel supply valve 15 can be more retarded than the valve opening timing IO of the intake valve 10. Therefore, even if there is the period of overlap between the valve opening period of the intake valve 10 and the valve opening period of the exhaust valve 14 (the period from the valve opening timing IO of the intake valve 10 to the valve closing timing EC of the exhaust valve 14 in FIG. 4), it is possible to suppress discharge of a part of the fuel gas supplied from the fuel supply port 26 to the combustion chamber 20 from the exhaust port 24 without being burned. Thus, it is possible to suppress the decrease in engine efficiency, and to implement the highly efficient hydrogen engine 2.

Further, as described above, by providing the fuel supply valve 15 with the collar portion 50 satisfying $H1>0.7L$ (more preferably by satisfying $H1>L$), the valve opening timing FO of the fuel supply valve 15 can be more retarded than the valve closing timing EC of the exhaust valve 14. Therefore, it is possible to effectively suppress discharge of a part of the fuel gas supplied from the fuel supply port 26 to the combustion chamber 20 from the exhaust port 24 without being burned.

Figure 7A:
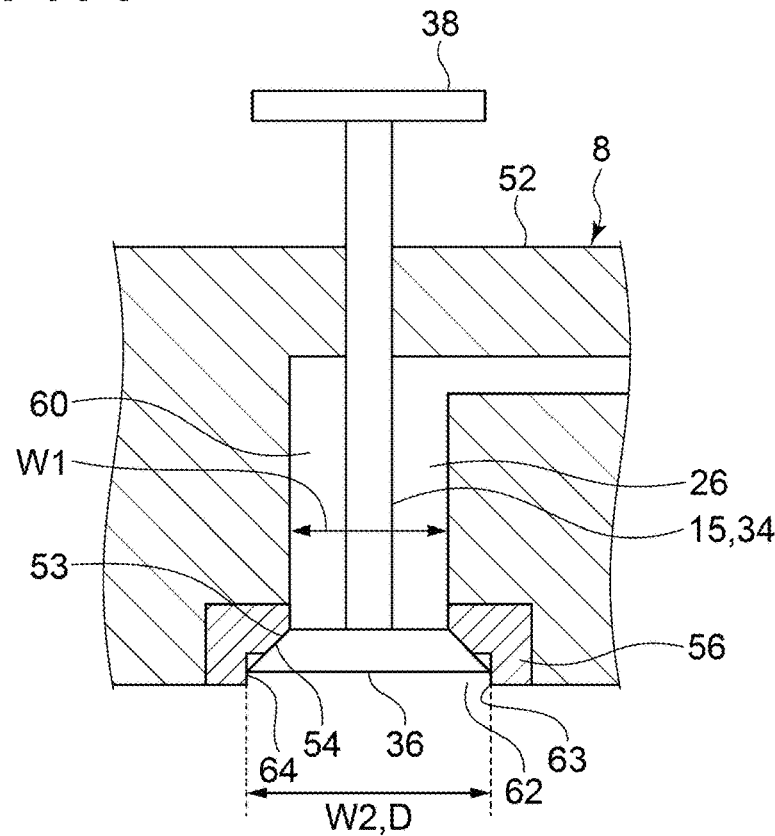
FIG. 7A is a view for describing an example of a detailed configuration of a cylinder head 8 shown in FIGS. 1 and 2, and shows the state in which the valve body portion 36 of the fuel supply valve 15 abuts against the valve seat surface 54 of the fuel supply port 26 and the fuel supply port 26 is closed.
Figure 7B:
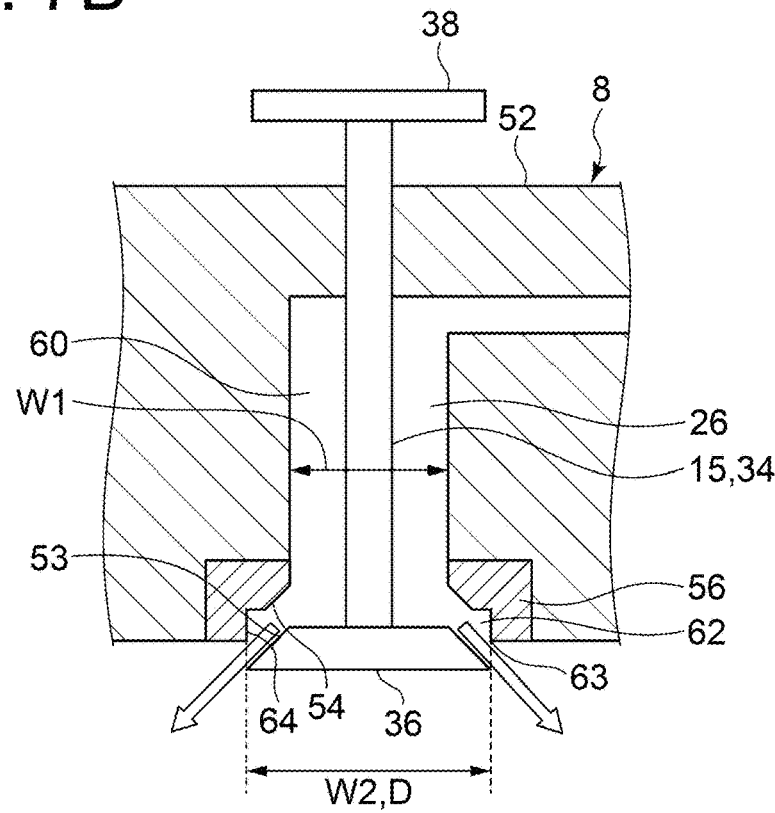
FIG. 7B is a view for describing an example of the detailed configuration of the cylinder head 8 shown in FIGS. 1 and 2, and shows the state in which the valve body portion 36 of the fuel supply valve 15 is separated from the valve seat surface 54 of the fuel supply port 26 and the fuel supply port 26 is open.
Figure 7C:
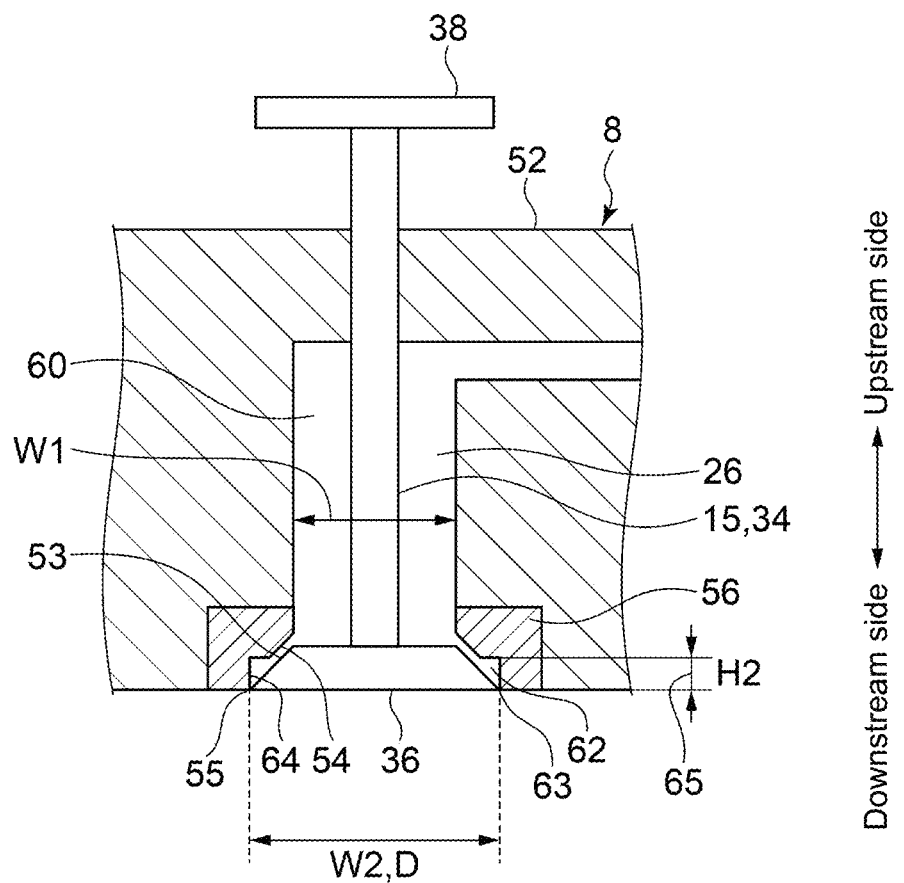
FIG. 7C is a view for describing an example of the detailed configuration of the cylinder head 8 shown in FIGS. 1 and 2, and shows a state in which the valve body portion 36 of the fuel supply valve 15 is separated from the valve seat surface 54 and the valve body portion 36 of the fuel supply valve 15 is in contact with an inner peripheral surface of a valve seat member 56 (a state between the state shown in FIG. 7A and the state shown in FIG. 7B).

Each of FIGS. 7A to 7C is a view for describing an example of the detailed configuration of the cylinder head 8 shown in FIGS. 1 and 2. FIG. 7A shows the state in which the valve body portion 36 of the fuel supply valve 15 abuts against the valve seat surface 54 of the fuel supply port 26 and the fuel supply port 26 is closed. FIG. 7B shows the state in which the valve body portion 36 of the fuel supply valve 15 is separated from the valve seat surface 54 of the fuel supply port 26 and the fuel supply port 26 is open. FIG. 7C shows a state in which the valve body portion 36 of the fuel supply valve 15 is separated from the valve seat surface 54 and the valve body portion 36 of the fuel supply valve 15 is in contact with the inner peripheral surface of the valve seat member 56 (a state between the state shown in FIG. 7A and the state shown in FIG. 7B).

In the examples shown in FIGS. 7A to 7C, the fuel supply port 26 includes a first flow passage portion 60 disposed along the axial direction of the fuel supply valve 15, the valve seat surface 54 disposed downstream of the first flow passage portion 60, and a second flow passage portion 62 disposed downstream of the valve seat surface 54 and having a flow passage width W2 greater than a flow passage width W1 of the first flow passage portion 60. In the illustrated example, a step 65 is formed between the valve seat surface 54 and an opening end 63 on an outlet side of the fuel supply port 26.

An outer diameter D of the valve body portion 36 approximately coincides with the flow passage width W2 of the second flow passage portion 62, and a downstream end edge 55 (maximum outer diameter portion) of the outer peripheral surface 53 (the above-described inclined surface 53) of the valve body portion 36 of the fuel supply valve 15 is configured to slide on a flow passage wall 64 of the second flow passage portion 62. The outer diameter D of the valve body portion 36 means a maximum value of the outer diameter of the valve body portion 36, and in the illustrated example means the outer diameter of the valve body portion 36 at a lower end of the valve body portion 36.

Herein, the second flow passage portion 62 is configured to satisfy $H2>0.7L$, where H2 is a length of the second flow passage portion 62 (a height of the above-described step 65) in the axial direction of the fuel supply valve 15 as shown in FIG. 7C and L is the lift amount of the fuel supply valve 15 at the valve closing timing EC of the exhaust valve 14 in the exhaust stroke of the hydrogen engine 2 as shown in FIG. 6. Further, more preferably, the second flow passage portion 62 is configured to satisfy $H2>L$.

According to the configurations shown in FIGS. 7A to 7C, the second flow passage portion 62 having the flow passage width W2 greater than the flow passage width W1 of the first flow passage portion 60 is disposed downstream of the valve seat surface 54, and the outer peripheral surface 53 of the valve body portion 36 is configured to slide on the flow passage wall 64 of the second flow passage portion 62. Therefore, as shown in FIG. 7C, even if the valve body portion 36 is separated from the valve seat surface 54, it is possible to maintain the state in which the fuel supply port 26 is closed or the state in which the opening area of the fuel supply port 26 is small as long as the outer peripheral surface 53 of the valve body portion 36 slides on the flow passage wall 64 of the second flow passage portion 62. Whereby, the valve opening timing FO of the fuel supply valve 15 can be more retarded than the valve opening timing IO of the intake valve 10. Therefore, even if there is the period of overlap between the valve opening period of the intake valve 10 and the valve opening period of the exhaust valve 14, it is possible to suppress discharge of a part of the fuel gas supplied from the fuel supply port 26 to the combustion chamber 20 from the exhaust port 24 without being burned. Thus, it is possible to suppress the decrease in engine efficiency, and to implement the highly efficient hydrogen engine 2.

Further, as described above, by satisfying $H2>0.7L$ (more preferably by satisfying $H2>L$), the valve opening timing FO of the fuel supply valve 15 can be more retarded than the valve closing timing EC of the exhaust valve 14. Therefore, it is possible to effectively suppress discharge of a part of the fuel gas supplied from the fuel supply port 26 to the combustion chamber 20 from the exhaust port 24 without being burned.

Figure 8A:
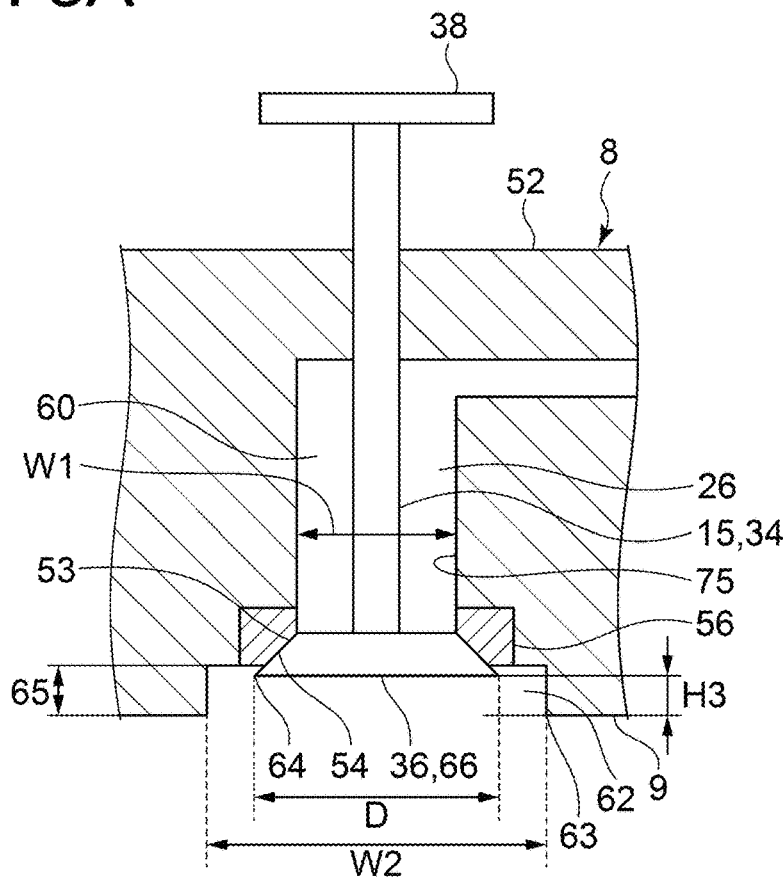
FIG. 8A is a view for describing an example of the detailed configuration of the cylinder head 8 shown in FIGS. 1 and 2, and shows the state in which the valve body portion 36 of the fuel supply valve 15 abuts against the valve seat surface 54 of the fuel supply port 26 and the fuel supply port 26 is closed.
Figure 8B:
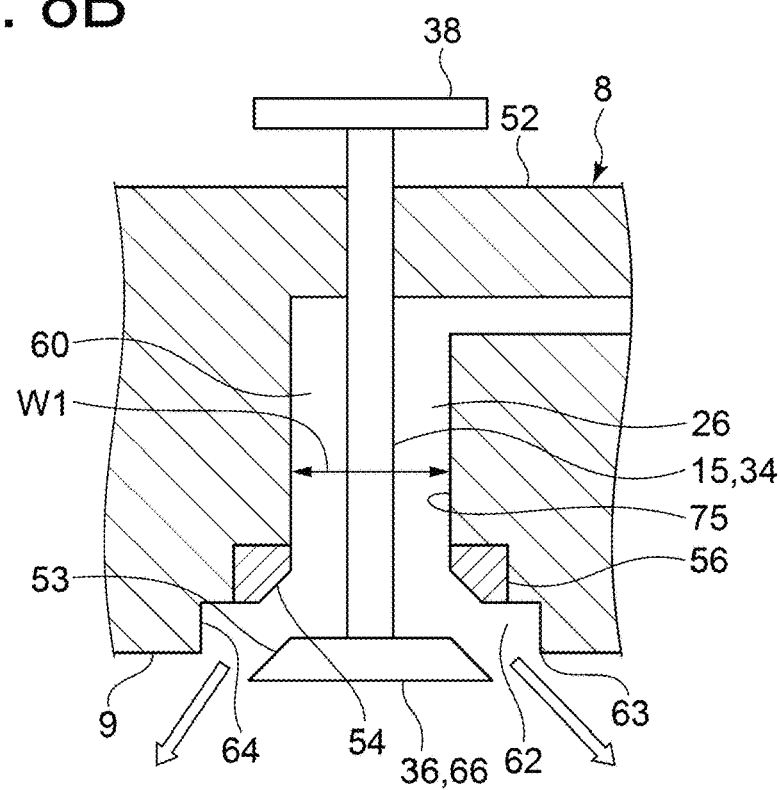
FIG. 8B is a view for describing an example of the detailed configuration of the cylinder head 8 shown in FIGS. 1 and 2, and shows the state in which the valve body portion 36 of the fuel supply valve 15 is separated from the valve seat surface 54 of the fuel supply port 26 and the fuel supply port 26 is open.
Figure 8C:
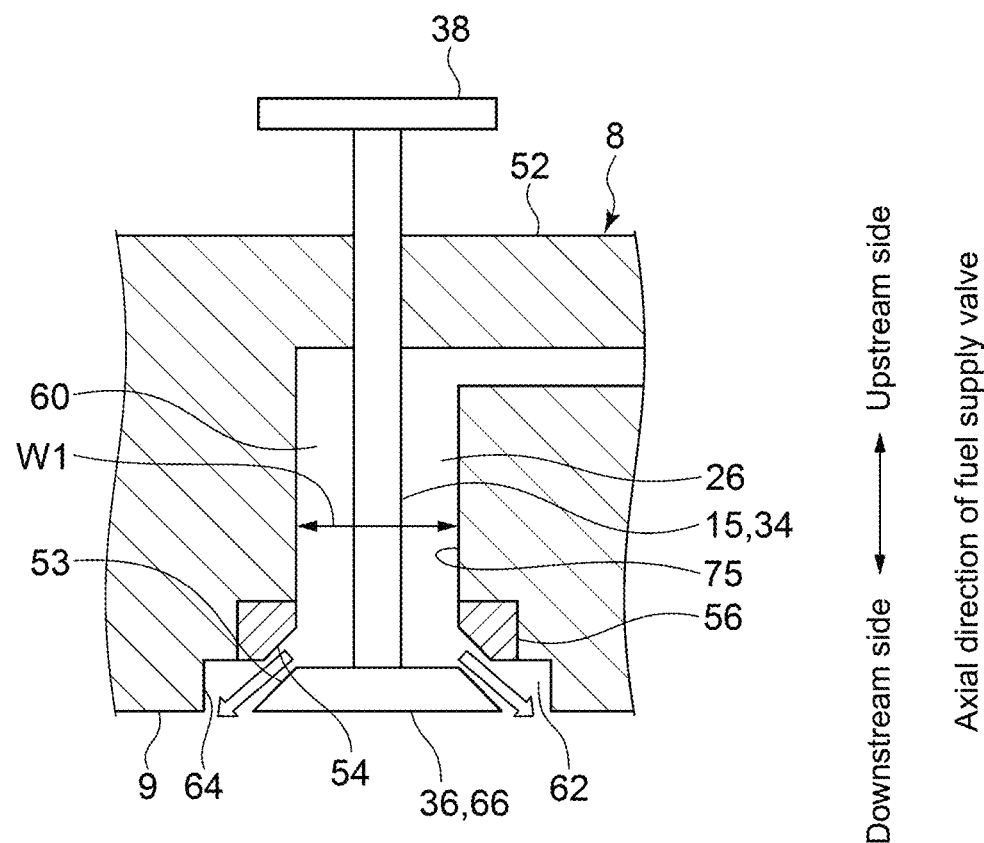
FIG. 8C is a view for describing an example of the detailed configuration of the cylinder head 8 shown in FIGS. 1 and 2, and shows the state in which the valve body portion 36 of the fuel supply valve 15 is separated from the valve seat surface 54 of the fuel supply port 26 and the fuel supply port 26 is open (a state between the state shown in FIG. 8A and the state shown in FIG. 8B).

Each of FIGS. 8A to 8C is a view for describing another example of the detailed configuration of the cylinder head 8 shown in FIGS. 1 and 2. FIG. 8A shows the state in which the valve body portion 36 of the fuel supply valve 15 abuts against the valve seat surface 54 of the fuel supply port 26 and the fuel supply port 26 is closed. FIG. 8B shows the state in which the valve body portion 36 of the fuel supply valve 15 is separated from the valve seat surface 54 of the fuel supply port 26 and the fuel supply port 26 is open. FIG. 8C shows the state in which the valve body portion 36 of the fuel supply valve 15 is separated from the valve seat surface 54 of the fuel supply port 26 and the fuel supply port 26 is open (a state between the state shown in FIG. 8A and the state shown in FIG. 8B).

In the configurations shown in FIGS. 8A to 8C, the fuel supply port 26 includes the first flow passage portion 60 disposed along the axial direction of the fuel supply valve 15, the valve seat surface 54 disposed downstream of the first flow passage portion 60, and the second flow passage portion 62 disposed downstream of the valve seat surface 54 and having the flow passage width W2 greater than the flow passage width W1 of the first flow passage portion 60 (see FIG. 8A). In the illustrated example, the step 65 is formed between the valve seat surface 54 and the opening end 63 on the outlet side of the fuel supply port 26. Further, the flow passage width W2 of the second flow passage portion 62 is greater than the outer diameter D of the valve body portion 36 (see FIG. 8A). The outer diameter D of the valve body portion 36 means the maximum value of the outer diameter of the valve body portion 36, and in the illustrated example means the outer diameter of the valve body portion 36 at the lower end of the valve body portion 36.

Further, as shown in FIG. 8A, in the state in which the fuel supply valve 15 abuts against the valve seat surface 54 disposed in the fuel supply port 26, the lower surface 66 of the fuel supply valve 15 is located upstream, that is, on an upper side of the fuel gas flow in the axial direction of the fuel supply valve 15 relative to the lower surface 9 of the cylinder head 8.

Further, the second flow passage portion 62 is configured to satisfy H3>L, where H3 is a distance between the lower surface 66 of the fuel supply valve 15 and the lower surface 9 of the cylinder head 8 in the axial direction of the fuel supply valve 15 in the state in which the fuel supply valve 15 abuts against the valve seat surface 54 disposed in the fuel supply port 26 as shown in FIG. 8A and L is the lift amount of the fuel supply valve 15 at the valve closing timing EC of the exhaust valve 14 in the exhaust stroke of the hydrogen engine 2 as shown in FIG. 6.

According to the configurations shown in FIGS. 8A to 8C, as shown in FIG. 8C, even if the valve body portion 36 is separated from the valve seat surface 54, the fuel gas flows in the second flow passage portion 62 and then is supplied to the combustion chamber 20. Therefore, it is possible to delay a time for the fuel gas to reach the position of the exhaust valve 14. Therefore, even if there is the period of overlap between the valve opening period of the intake valve 10 and the valve opening period of the exhaust valve 14 (the period from the valve opening timing IO of the intake valve 10 to the valve closing timing EC of the exhaust valve 14 in FIG. 4), it is possible to suppress discharge of a part of the fuel gas supplied from the fuel supply port 26 to the combustion chamber 20 from the exhaust port 24 without being burned. Thus, it is possible to suppress the decrease in engine efficiency, and to implement the highly efficient hydrogen engine 2.

Further, by satisfying H3>L as described above, the valve opening timing FO of the fuel supply valve 15 can be more retarded than the valve closing timing EC of the exhaust valve 14. Therefore, it is possible to effectively suppress discharge of a part of the fuel gas supplied from the fuel supply port 26 to the combustion chamber 20 from the exhaust port 24 without being burned.

Figure 9A:
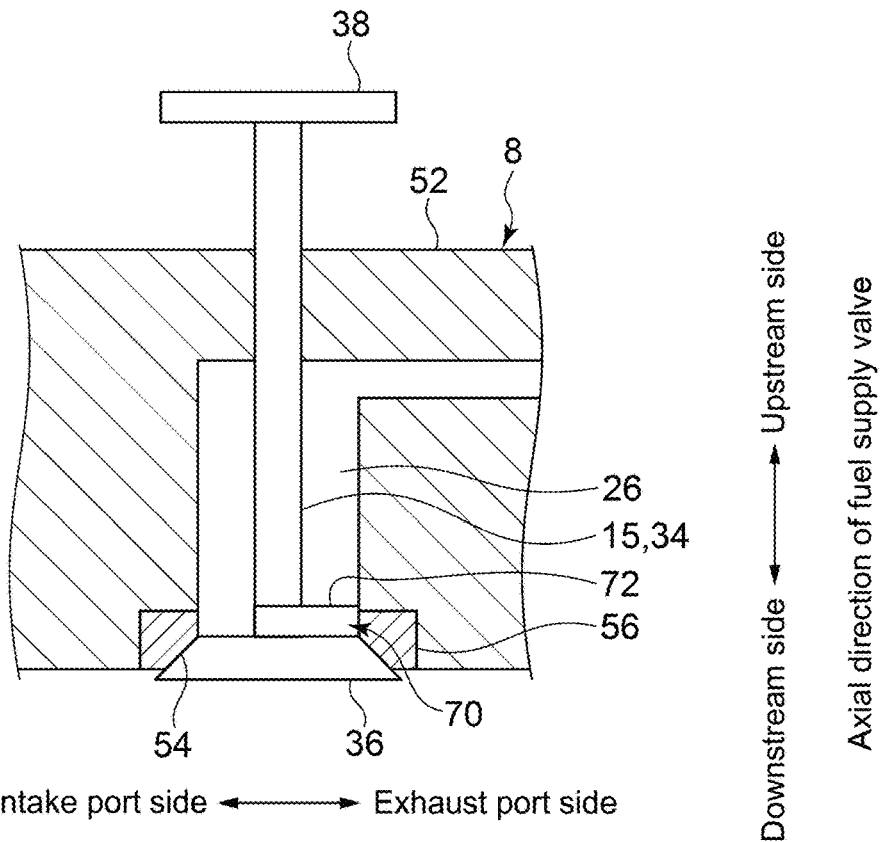
FIG. 9A is a view for describing an example of the detailed configuration of the fuel supply valve 15 shown in FIGS. 1 and 2, and shows the state in which the valve body portion 36 of the fuel supply valve 15 abuts against the valve seat surface 54 of the fuel supply port 26 and the fuel supply port 26 is closed.
Figure 9B:
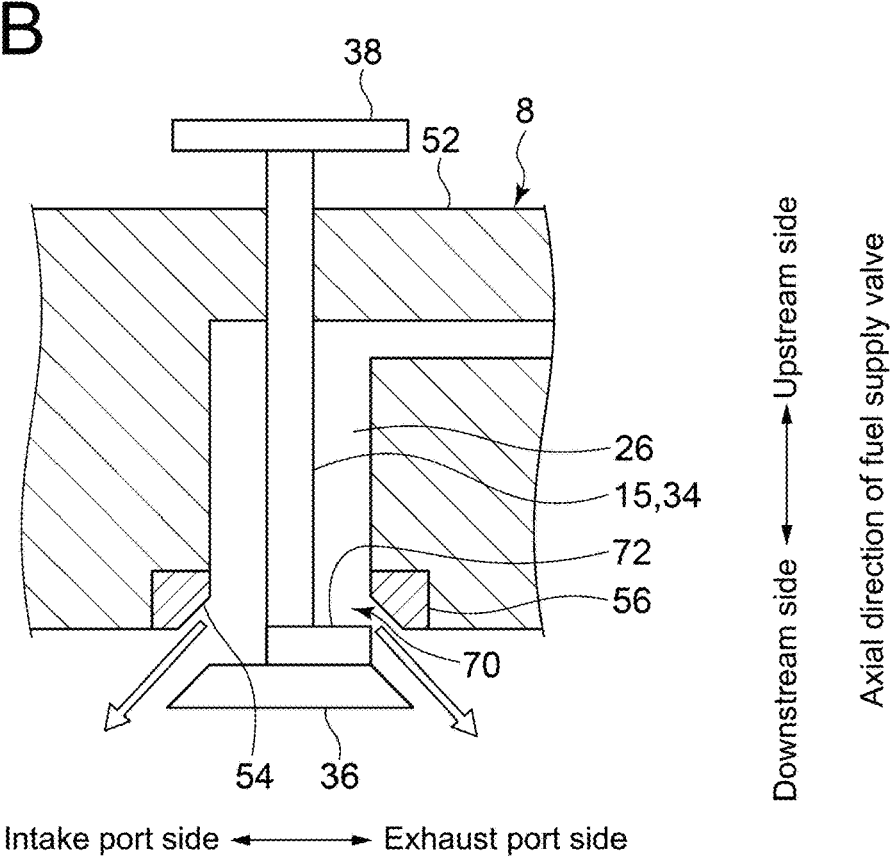
FIG. 9B is a view for describing an example of the detailed configuration of the fuel supply valve 15 shown in FIGS. 1 and 2, and shows the state in which the valve body portion 36 of the fuel supply valve 15 is separated from the valve seat surface 54 of the fuel supply port 26 and the fuel supply port 26 is open.
Figure 9C:
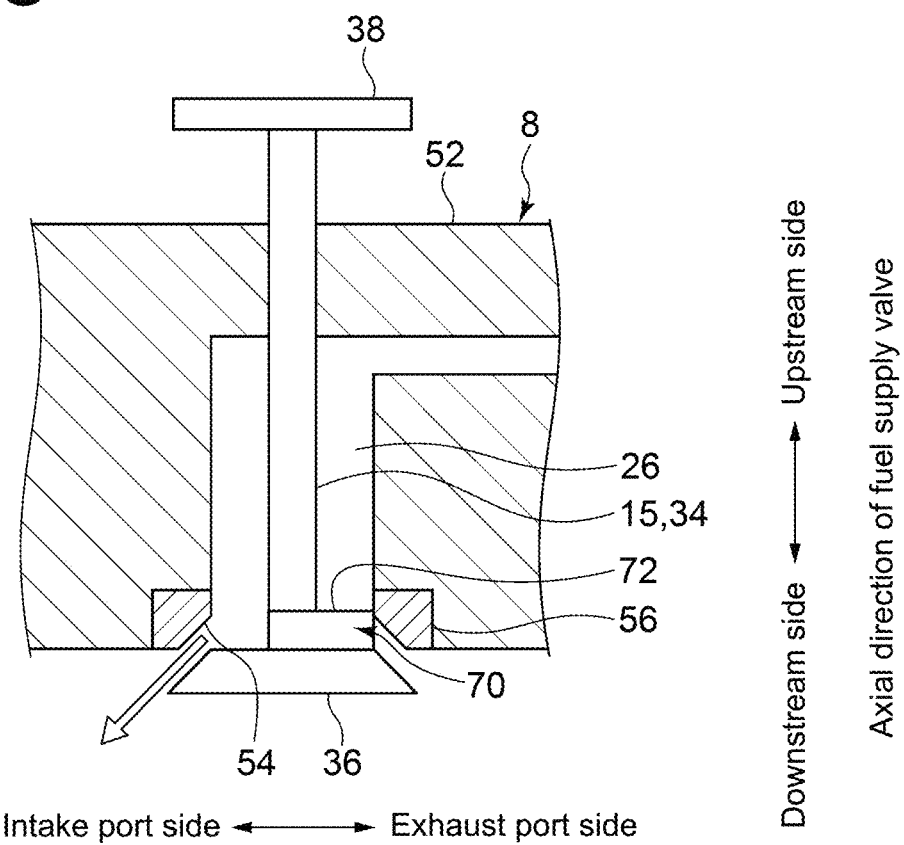
FIG. 9C is a view for describing an example of the detailed configuration of the fuel supply valve 15 shown in FIGS. 1 and 2, and shows a state in which the valve body portion 36 of the fuel supply valve 15 is separated from the valve seat surface 54 and at least a part of an outlet portion 70 of the fuel supply port 26 on an exhaust port 24 side is covered by the collar portion 72 (cover portion) of the fuel supply valve 15 (a state between the state shown in FIG. 9A and the state shown in FIG. 9B).

Each of FIGS. 9A to 9C is a view for describing another example of the detailed configuration of the fuel supply valve 15 shown in FIGS. 1 and 2. FIG. 9A shows the state in which the valve body portion 36 of the fuel supply valve 15 abuts against the valve seat surface 54 of the fuel supply port 26 and the fuel supply port 26 is closed. FIG. 9B shows the state in which the valve body portion 36 of the fuel supply valve 15 is separated from the valve seat surface 54 of the fuel supply port 26 and the fuel supply port 26 is open. FIG. 9C shows a state in which the valve body portion 36 of the fuel supply valve 15 is separated from the valve seat surface 54 and at least a part of an outlet portion 70 of the fuel supply port 26 on an exhaust port 24 side is covered by the collar portion 72 (cover portion) of the fuel supply valve 15 (a state between the state shown in FIG. 9A and the state shown in FIG. 9B).

In the configurations shown in FIGS. 9A to 9C, the collar portion 72 is disposed adjacent to the valve body portion 36 between the valve stem 34 and the valve body portion 36 (the upper end of the valve body portion 36), has a fan shape when viewed in the axial direction of the fuel supply valve 15, and is disposed so as to protrude from the valve stem 34 in the radial direction of the valve stem 34. The amount of the protrusion of the collar portion 72 from the valve stem 34 in the radial direction of the valve stem 34 (the length of the chord of the above-described fan shape) may be set such that the outer peripheral surface of the collar portion 72 can slide on the flow passage wall of the fuel supply port 26 (the inner peripheral surface of the valve seat member 56). Further, in the state in which the valve body portion 36 abuts against the valve seat surface 54 of the fuel supply port 26 in the axial direction of the fuel supply valve 15 (see FIG. 9A), the collar portion 72 is located upstream of the fuel gas flow in the axial direction of the fuel supply valve 15 relative to the valve seat surface 54.

In the configurations shown in FIGS. 9A to 9C, the collar portion 72 is configured to cover at least a part of the outlet portion 70 of the fuel supply port 26 on the exhaust port 24 side in at least a part of the valve opening period of the fuel supply valve 15. Whereby, at the initial stage of the lift operation of the fuel supply valve 15, it possible to prevent the fuel gas flow from the fuel supply port 26 to the exhaust port 24 side, and to introduce the fuel gas from the fuel supply port 26 to an intake port 22 side. Therefore, it is possible to suppress slip out of the fuel gas from the fuel supply port 26 to the exhaust port 24 side in the valve opening period of the exhaust valve 14. In the configuration including the above-described collar portion 72, a rotation stopper may be provided to prevent the rotation of the fuel supply valve 15. The rotation stopper may be implemented by, for example, providing a notch in the valve stem 34 of the fuel supply valve 15 and providing in the cylinder head 8 an engagement portion engaging with the notch.

Figure 10A:
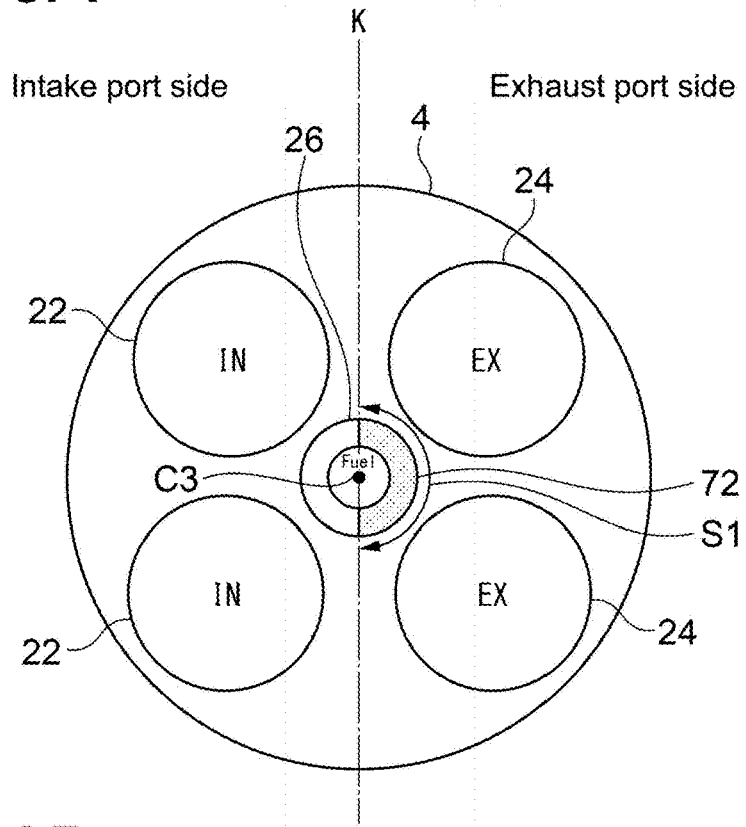
FIG. 10A is a view for describing an example of a range in which the collar portion 72 is disposed.

Further, for example, as shown in FIG. 10A, the collar portion 72 may be disposed in a range S1 on the exhaust port 24 side in the circumferential direction around an axis C3 of the fuel supply valve 15 (the central axis of the valve stem 34). In the example shown in FIG. 10A, a side on which two intake ports 22 are arranged is defined as the intake port 22 side and a side on which two exhaust ports 24 are arranged is defined as the exhaust port 24 side with respect to a plane K including the axis C3 of the fuel supply valve 15.

Figure 10B:
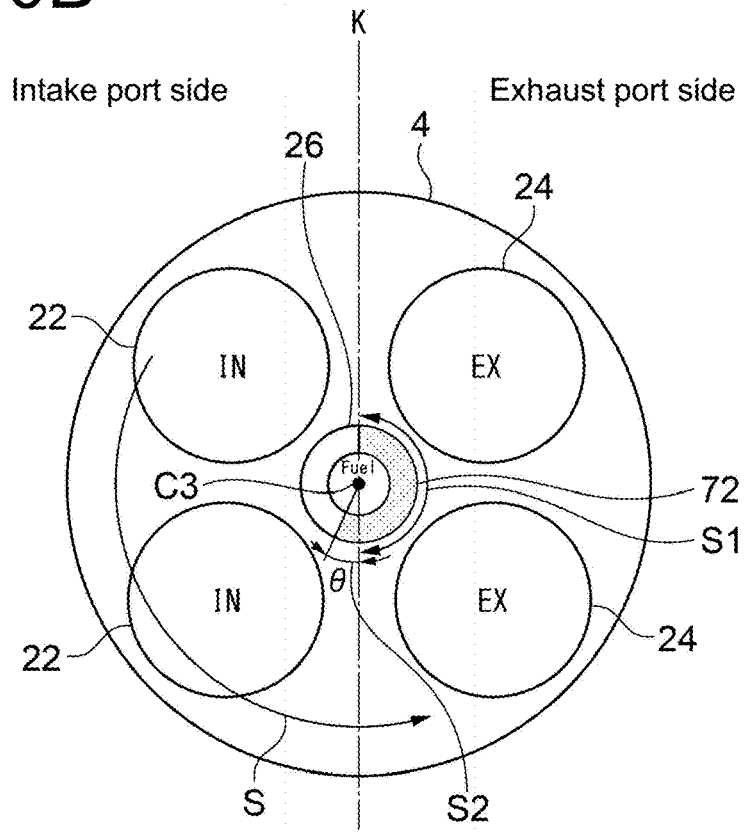
FIG. 10B is a view for describing another example of the range in which the collar portion 72 is disposed.

Further, for example, as shown in FIG. 10B, the collar portion 72 may be disposed in a range of not less than 180°, which includes the range S1 on the exhaust port 24 side, in the circumferential direction around the axis C3 of the fuel supply valve 15. In the example shown in FIG. 10B, the collar portion 72 is disposed over the range S1 on the exhaust port 24 side and the range S2 adjacent to an upstream side of the range S1 in a swirl direction of a swirling flow of intake air flowing into the combustion chamber 20 from the intake ports 22, in the circumferential direction around the axis of the fuel supply valve 15.

More specifically, where a strength S of the swirling flow is a dimensionless number indicating how many times the swirling flow of the intake air flowing into the combustion chamber 20 from the intake ports 22 rotates about the combustion chamber 20 during one rotation of the hydrogen engine 2, an angular width OL is a width of the crank angle, which corresponds to, of one combustion cycle of the hydrogen engine 2, the period of overlap between the valve opening period of the exhaust valve 14 and the valve opening period of the fuel supply valve 15 (a width of the crank angle from the valve opening timing FO of the fuel supply valve 15 to the valve closing timing EC of the exhaust valve 14 in FIG. 6), and an angle θ is a product of the strength S of the swirling flow and the angular width OL, the collar portion 72 may be configured in a range including, in the circumferential direction around the axis C3 of the fuel supply valve 15, the range S1 on the exhaust port 24 side and the range S2 of the angle θ from an upstream end in a rotational direction of the swirling flow in the range S1 to the upstream side in the rotational direction of the swirling flow. Whereby, in consideration of the strength S of the swirling flow of the intake air flowing into the combustion chamber 20, it is possible to effectively suppress slip out of the fuel gas from the fuel supply port 26 to the exhaust port 24 side in the valve opening period of the exhaust valve 14.

Figure 11:
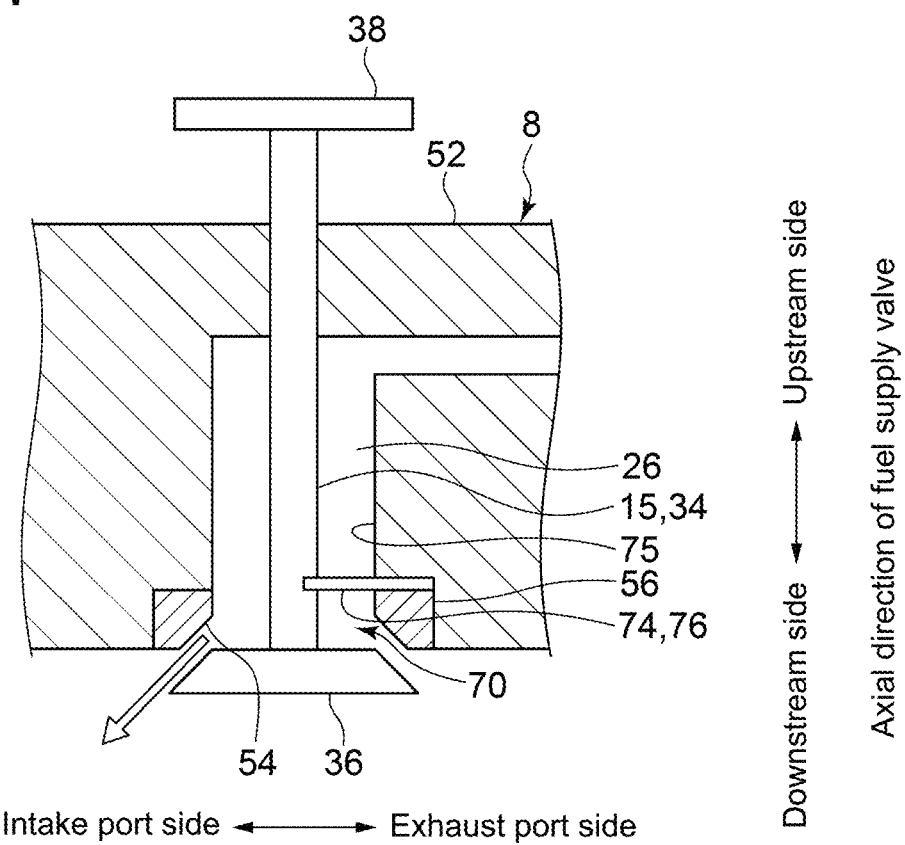
FIG. 11 is a view for describing still another example of the detailed configuration of the cylinder head 8 shown in FIGS. 1 and 2.

FIG. 11 is a view for describing yet another example of the detailed configuration of the cylinder head 8 shown in FIGS. 1 and 2.

In the configuration shown in FIG. 11, the cylinder head 8 includes the cylinder head body 52, the annular valve seat member 56 forming the valve seat surface 54 of the fuel supply port 26 and configured separately from the cylinder head body 52, and a mask plate 74 located between the cylinder head body 52 and the valve seat member 56 in the axial direction of the fuel supply valve 15.

The mask plate 74 is located upstream of the fuel gas flow relative to the valve seat member 56 in the axial direction of the fuel supply valve 15, and is interposed between the cylinder head body 52 and the valve seat member 56. The mask plate 74 has a fan shape when viewed in the axial direction of the fuel supply valve 15, and includes a protruding portion 76 (cover portion) protruding from the flow passage wall 75 of the fuel supply port 26 toward the valve stem 34. The amount of the protrusion of the mask plate 74 from the flow passage wall 75 in the radial direction of the valve stem 34 (the length of the chord of the above-described fan shape) may be set to a protrusion amount that allows an inner peripheral edge of the mask plate 74 to slide on the outer peripheral surface of the valve stem 34.

The protruding portion 76 of the mask plate 74 is configured to cover at least a part of the outlet portion 70 of the fuel supply port 26 on the exhaust port 24 side. Whereby, since the fuel gas is less likely to flow from the fuel supply port 26 to the exhaust port 24 side, it is possible to suppress discharge of a part of the fuel gas supplied from the fuel supply port 26 to the combustion chamber 20 from the exhaust port 24 without being burned. Further, compared to the configurations shown in FIGS. 9A to 9C, by reducing the weight of the fuel supply valve 15, it is possible to improve responsiveness of the fuel supply valve 15 and to facilitate manufacture or quality control of the fuel supply valve 15. Furthermore, since the fuel gas is less likely to be supplied to the exhaust port 24 side regardless of the lift amount of the fuel supply valve 15, a fuel distribution within the cylinder 4 becomes such that a fuel concentration is high on the intake side and the fuel concentration is low on the exhaust side. Thus, since the intake side burns before the exhaust side, it is possible to suppress knocking (if the fuel concentration is uniform, since the exhaust side having a high temperature burns first and the intake side burns over time, an end gas left on a low-temperature wall surface on the intake side self-ignites finally, causing knocking).

Figure 12A:
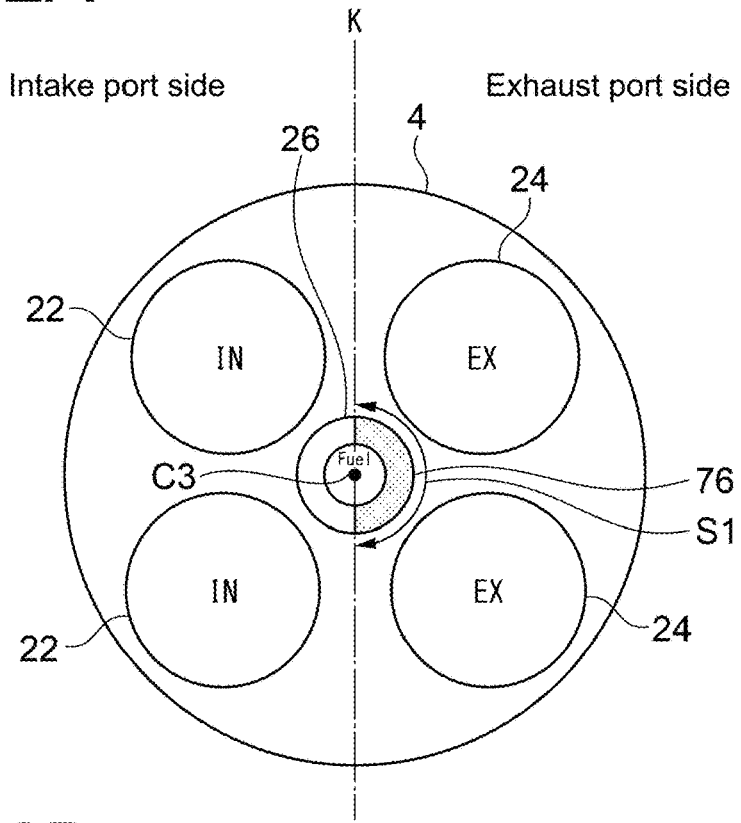
FIG. 12A is a view for describing an example of a range in which a protruding portion 76 of a mask plate 74 is disposed.

In the configuration having the above-described mask plate 74, for example, as shown in FIG. 12A, the protruding portion 76 of the mask plate 74 may be disposed in the range S1 on the exhaust port 24 side in the circumferential direction around the axis C of the fuel supply valve 15. In the example shown in FIG. 12A, the side on which the two intake ports 22 are arranged is defined as the intake port 22 side and the side on which the two exhaust ports 24 are arranged is defined as the exhaust port 24 side with respect to the plane K including the axis C of the fuel supply valve 15.

Figure 12B:
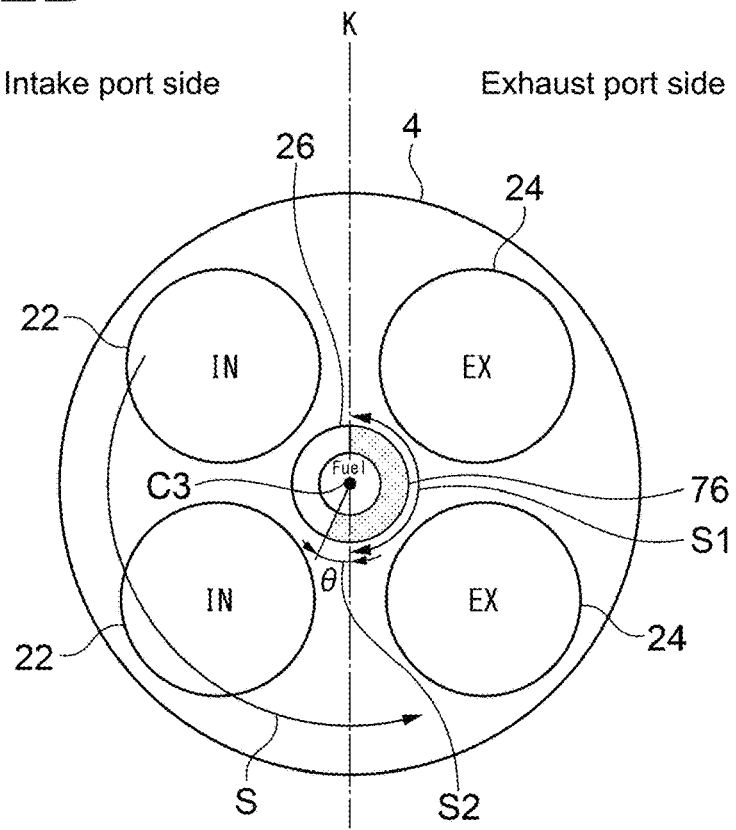
FIG. 12B is a view for describing another example of the range in which the protruding portion 76 of the mask plate 74 is disposed.

Further, for example, as shown in FIG. 12B, the protruding portion 76 of the mask plate 74 may be disposed in the range of not less than 180°, which includes the range S1 on the exhaust port 24 side, in the circumferential direction around the axis of the fuel supply valve 15. In the example shown in FIG. 12B, the protruding portion 76 of the mask plate 74 is disposed over the range S1 on the exhaust port 24 side and the range S2 adjacent to the upstream side of the range S1 in the swirl direction of the swirling flow of the intake air flowing into the combustion chamber from the intake ports, in the circumferential direction around the axis of the fuel supply valve 15. More specifically, where the angle θ is the above-described product of the strength S of the swirling flow and the angular width OL, the protruding portion 76 of the mask plate 74 may be configured in the range including, in the circumferential direction around the axis C of the fuel supply valve 15, the range S1 on the exhaust port 24 side and the range S2 of the angle θ from the upstream end in the rotational direction of the swirling flow in the range S1 to the upstream side in the rotational direction of the swirling flow. Whereby, in consideration of the strength S of the swirling flow of the intake air flowing into the combustion chamber 20, it is possible to effectively suppress slip out of the fuel gas from the fuel supply port 26 to the exhaust port 24 side in the valve opening period of the exhaust valve.

Figure 13:
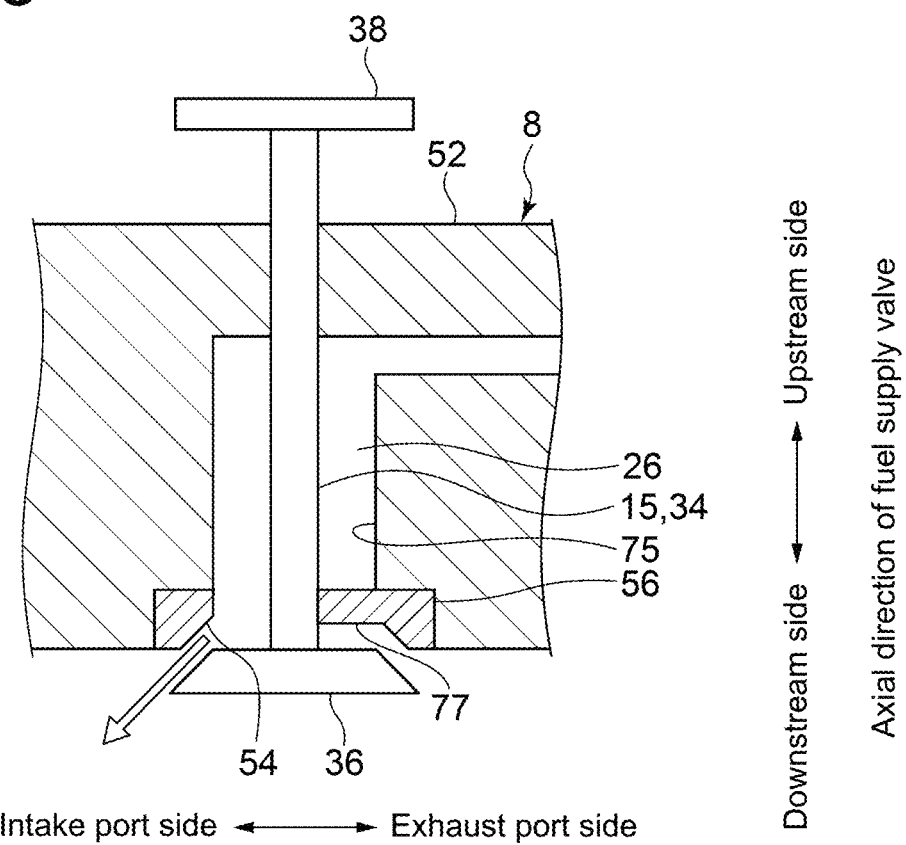
FIG. 13 is a view for describing yet another example of the detailed configuration of the cylinder head 8 shown in FIGS. 1 and 2.

FIG. 13 is a view for describing yet another example of the detailed configuration of the cylinder head 8 shown in FIGS. 1 and 2.

In the configuration shown in FIG. 13, the annular valve seat member 56 includes a protruding portion 77 (cover portion) protruding from the flow passage wall 75 of the fuel supply port 26 toward the valve stem 34. The amount of the protrusion of the valve seat member 56 from the flow passage wall 75 in the radial direction of the valve stem 34

(the length of the chord of the above-described fan shape) may be set to a protrusion amount that allows the protruding portion 77 of the valve seat member 56 to slide on the outer peripheral surface of the valve stem 34.

The protruding portion 77 of the valve seat member 56 is configured to cover at least a part of the outlet portion 70 of the fuel supply port 26 on the exhaust port 24 side. Whereby, since the fuel gas is less likely to flow from the fuel supply port 26 to the exhaust port 24 side, it is possible to suppress discharge of a part of the fuel gas supplied from the fuel supply port 26 to the combustion chamber 20 from the exhaust port 24 without being burned. Further, compared to the configurations shown in FIGS. 9A to 9C, by reducing the weight of the fuel supply valve 15, it is possible to improve responsiveness of the fuel supply valve 15 and to facilitate manufacture or quality control of the fuel supply valve 15. Furthermore, since the fuel gas is less likely to be supplied to the exhaust port 24 side regardless of the lift amount of the fuel supply valve 15, a fuel distribution within the cylinder 4 becomes such that the fuel concentration is high on the intake side and the fuel concentration is low on the exhaust side. Thus, since the intake side burns before the exhaust side, it is possible to suppress knocking (if the fuel concentration is uniform, since the exhaust side having the high temperature burns first and the intake side burns over time, the end gas left on the low-temperature wall surface on the intake side self-ignites finally, causing knocking). Further, the number of parts can be reduced as compared to the configuration shown in FIG. 11.

Figure 14A:
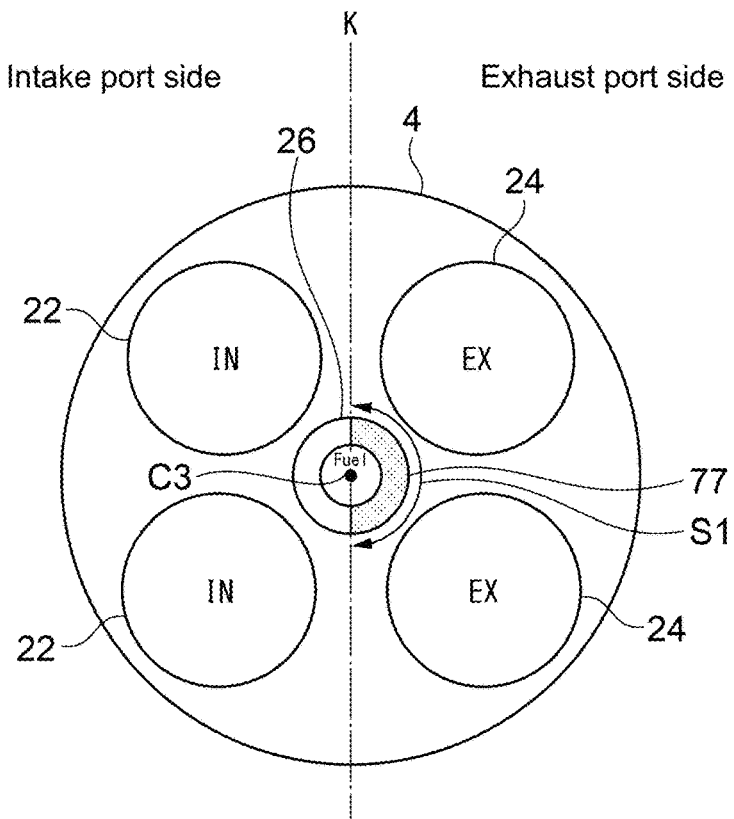
FIG. 14A is a view for describing an example of a range in which a protruding portion 77 of the valve seat member 56 is disposed.

In the case where the protruding portion 77 of the valve seat member 56 described above is disposed, for example, as shown in FIG. 14A, the protruding portion 77 of the valve seat member 56 may be disposed in the range S1 on the exhaust port 24 side in the circumferential direction around the axis C of the fuel supply valve 15. In the example shown in FIG. 14A, the side on which the two intake ports 22 are arranged is defined as the intake port 22 side and the side on which the two exhaust ports 24 are arranged is defined as the exhaust port 24 side with respect to the plane K including the axis C of the fuel supply valve 15.

Figure 14B:
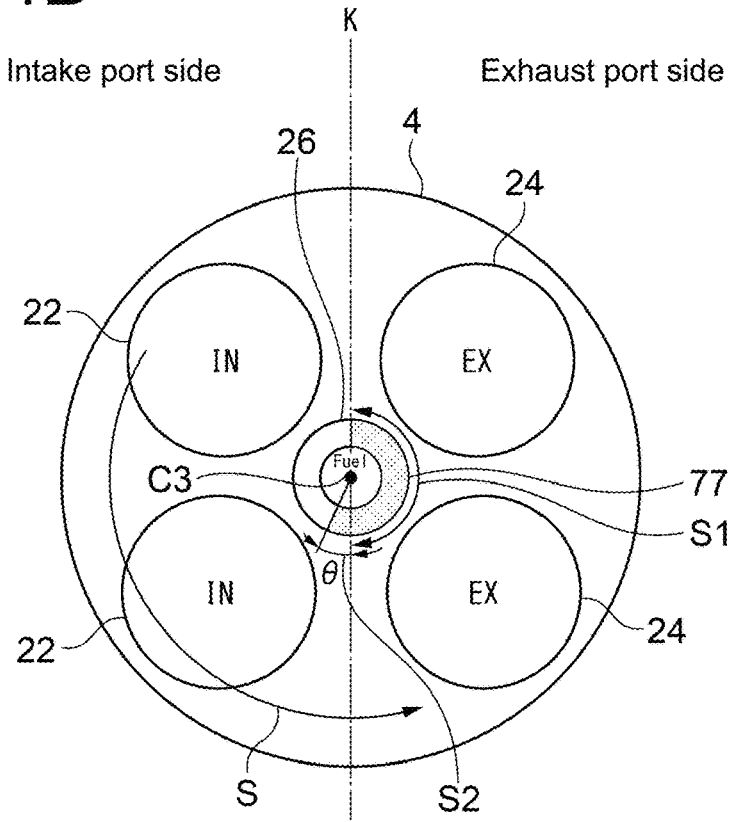
FIG. 14B is a view for describing another example of the range in which the protruding portion 77 of the valve seat member 56 is disposed.

Further, for example, as shown in FIG. 14B, the protruding portion 77 of the valve seat member 56 may be disposed in the range of not less than 180°, which includes the range S1 on the exhaust port 24 side, in the circumferential direction around the axis of the fuel supply valve 15. In the example shown in FIG. 14B, the protruding portion 77 of the valve seat member 56 is disposed over the range S1 on the exhaust port 24 side and the range S2 adjacent to the upstream side of the range S1 in the swirl direction of the swirling flow of the intake air flowing into the combustion chamber from the intake ports, in the circumferential direction around the axis of the fuel supply valve 15. More specifically, where the angle θ is the above-described product of the strength S of the swirling flow and the angular width OL, the protruding portion 77 of the valve seat member 56 may be configured in the range including the range S1 on the exhaust port 24 side and the range S2 of the angle θ from the upstream end in the rotational direction of the swirling flow in the range S1 to the upstream side in the rotational direction of the swirling flow. Whereby, in consideration of the strength S of the swirling flow of the intake air flowing into the combustion chamber 20, it is possible to effectively suppress slip out of the fuel gas from the fuel supply port 26 to the exhaust port 24 side in the valve opening period of the exhaust valve.

The present disclosure is not limited to the above-described embodiments, and also includes an embodiment obtained by modifying the above-described embodiments or an embodiment obtained by combining these embodiments as appropriate.

The contents described in the above embodiments would be understood as follows, for instance.

(1) A hydrogen engine according to at least one embodiment of the present disclosure is a hydrogen engine (such as the above-described hydrogen engine 2) using fuel gas containing hydrogen, including: a cylinder (such as the above-described cylinder 4); a piston (such as the above-described piston 6) movable within the cylinder; a cylinder head (such as the above-described cylinder head 8) forming a combustion chamber (such as the above-described combustion chamber 20) with the piston, and including an intake port (such as the above-described intake port 22) connected to the combustion chamber and a fuel supply port (such as the above-described fuel supply port 26) connected to the combustion chamber; an intake valve (such as the above-described intake valve 10) for opening and closing the intake port; a fuel supply valve (such as the above-described fuel supply valve 15) for opening and closing the fuel supply port; and a valve train (such as the above-described valve train 18) commonly provided for the intake valve and the fuel supply valve, and configured to open and close the intake valve and the fuel supply valve in conjunction with each other. The hydrogen engine is configured such that a valve opening timing (such as the above-described valve opening timing FO) of the fuel supply valve is more retarded than a valve opening timing (such as the above-described valve opening timing IO) of the intake valve.

According to the hydrogen engine as defined in the above (1), the fuel supply port is disposed separately from the intake port, and the fuel gas is supplied to the combustion chamber from the fuel supply port without via the intake port. Therefore, it is possible to suppress the occurrence of backfire in which a flame travels back to the intake port. Further, since the valve opening timing of the fuel supply valve is more retarded than the valve opening timing of the intake valve, even if there is the period of overlap between the valve opening period of the intake valve and the valve opening period of the exhaust valve, it is possible to suppress discharge of a part of the fuel gas supplied from the fuel supply port to the combustion chamber from the exhaust port without being burned. Thus, it is possible to suppress the decrease in engine efficiency, and to implement the highly efficient hydrogen engine. Therefore, it is possible to suppress the occurrence of backfire and to achieve high engine efficiency.

(2) In some embodiments, in the hydrogen engine as defined in the above (1), the valve train includes: an intake rocker arm (such as the above-described intake rocker arm 44) configured to rotate around a predetermined rotational axis (such as the above-described rotational axis C2) and to press the intake valve; and a fuel supply valve arm (such as the above-described fuel supply valve arm 48) configured to rotate around the rotational axis together with the intake rocker arm and to press the fuel supply valve, and a maximum value (such as the above-described maximum value g1max) of a distance between the fuel supply valve arm and the fuel supply valve in one combustion cycle of the engine is greater than a maximum value (such as the above-described maximum value g2max) of a distance between the intake rocker arm and the intake valve in the one combustion cycle of the engine.

According to the hydrogen engine as defined in the above (2), since the maximum value of the distance between the fuel supply valve arm and the fuel supply valve in the one combustion cycle of the engine is greater than the maximum value of the distance between the intake rocker arm and the intake valve in the one combustion cycle of the engine, the valve opening timing of the fuel supply valve can be more retarded than the valve opening timing of the intake valve. Therefore, with the simple configuration, it is possible to achieve the effect as defined in the above (1).

(3) In some embodiments, in the hydrogen engine as defined in the above (2), the distance (such as the above-described distance g1) between the fuel supply valve arm and the fuel supply valve at a valve closing timing (such as the above-described valve closing timing EC) of an exhaust valve of the engine is greater than 0.

According to the hydrogen engine as defined in the above (3), since the distance between the fuel supply valve arm and the fuel supply valve at the valve closing timing of the exhaust valve is greater than 0, the valve opening timing of the fuel supply valve can be more retarded than the valve closing timing of the exhaust valve. Therefore, it is possible to effectively suppress discharge of a part of the fuel gas supplied from the fuel supply port to the combustion chamber from the exhaust port without being burned.

(4) In some embodiments, in the hydrogen engine as defined in any of the above (1) to (3), the fuel supply valve includes: a valve stem (such as the above-described valve stem 34); a valve body portion (such as the above-described valve body portion 36) disposed on one end side of the valve stem and abuttable against a valve seat surface of the fuel supply port in an axial direction of the valve stem; and a collar portion (such as the above-described collar portion 50) disposed between the valve stem and the valve body portion, and located upstream of a flow of the fuel gas in an axial direction of the fuel supply valve relative to the valve seat surface of the fuel supply port in a state in which the valve body portion abuts against the valve seat surface.

According to the hydrogen engine as defined in the above (4), since the above-described collar portion is disposed in the fuel supply valve, the valve opening timing of the fuel supply valve can be more retarded than the valve opening timing of the intake valve. Therefore, with the simple configuration, it is possible to achieve the effect as defined in the above (1).

(5) In some embodiments, in the hydrogen engine as defined in the above (4), H1>0.7L is satisfied, where L is a lift amount of the fuel supply valve at a valve closing timing of an exhaust valve of the engine and H1 is a height of the collar portion.

According to the hydrogen engine as defined in the above (5), since the fuel supply valve includes the collar portion satisfying H1>0.7L, the valve opening timing of the fuel supply valve can be more retarded than the valve closing timing of the exhaust valve. Therefore, it is possible to effectively suppress discharge of a part of the fuel gas supplied from the fuel supply port to the combustion chamber from the exhaust port without being burned.

(6) In some embodiments, in the hydrogen engine as defined in any of the above (1) to (5), the fuel supply port includes: a first flow passage portion (such as the above-described first flow passage portion 60) disposed along an axial direction of the fuel supply valve; a valve seat surface (such as the above-described valve seat surface 54) disposed downstream of the first flow passage portion; and a second flow passage portion (such as the above-described second flow passage portion 62) disposed downstream of the valve seat surface and having a flow passage width greater than a flow passage width of the first flow passage portion, and an outer peripheral surface of a valve body portion of the fuel supply valve is configured to slide on a flow passage wall (such as the above-described flow passage wall 64) of the second flow passage portion.

According to the hydrogen engine as defined in the above (6), even if the valve body portion is separated from the valve seat surface, it is possible to maintain the state in which the fuel supply port is closed as long as the outer peripheral surface of the valve body portion slides on the flow passage wall of the second flow passage portion. Whereby, the valve opening timing of the fuel supply valve can be more retarded than the valve opening timing of the intake valve. Therefore, with the simple configuration, it is possible to achieve the effect as defined in the above (1). Further, since the weight of the fuel supply valve can be reduced compared to the configuration as defined in (4), it is possible to improve responsiveness of the fuel supply valve.

(7) In some embodiments, in the hydrogen engine as defined in the above (6), H2>0.7L is satisfied, where L is a lift amount of the fuel supply valve at a valve closing timing of an exhaust valve of the engine and H2 is a length of the second flow passage portion in an axial direction of the fuel supply valve.

According to the hydrogen engine as defined in the above (7), since H2>0.7L is satisfied, the valve opening timing of the fuel supply valve can be more retarded than the valve closing timing of the exhaust valve. Therefore, it is possible to effectively suppress discharge of a part of the fuel gas supplied from the fuel supply port to the combustion chamber from the exhaust port without being burned.

(8) A hydrogen engine according to at least one embodiment of the present disclosure is a hydrogen engine (such as the above-described hydrogen engine 2) using fuel gas containing hydrogen, including: a cylinder (such as the above-described cylinder 4); a piston (such as the above-described piston 6) movable within the cylinder; a cylinder head forming a combustion chamber (such as the above-described combustion chamber 20) with the piston, and including an intake port (such as the above-described intake port 22) connected to the combustion chamber, a fuel supply port (such as the above-described fuel supply port 26) connected to the combustion chamber, and an exhaust port (such as the above-described exhaust port 24) connected to the combustion chamber; an intake valve (such as the above-described intake valve 10) for opening and closing the intake port; a fuel supply valve (such as the above-described fuel supply valve 15) for opening and closing the fuel supply port; a valve train (such as the above-described valve train 18) commonly provided for the intake valve and the fuel supply valve, and configured to open and close the intake valve and the fuel supply valve in conjunction with each other; and a cover portion (such as the above-described collar portion 72, protruding portion 76, or protruding portion 77) configured to cover at least a part of an outlet portion of the fuel supply port on a side of the exhaust port in at least a part of a valve opening period of the fuel supply valve.

According to the hydrogen engine as defined in the above (8), since at least a part of the outlet portion of the fuel supply port on the side of the exhaust port is covered by the cover portion in at least a part of the valve opening period of the fuel supply valve, the fuel gas is less likely to flow from the fuel supply valve to the side of the exhaust port. Therefore, it is possible to suppress discharge of a part of the fuel gas supplied from the fuel supply port to the combustion chamber from the exhaust port without being burned.

(9) In some embodiments, in the hydrogen engine as defined in the above (8), the cover portion is a collar portion (such as the above-described collar portion 72) disposed between a valve stem of the fuel supply valve and a valve body portion, and the collar portion is formed in a disk or columnar shape, is located upstream of a flow of the fuel gas in an axial direction of the fuel supply valve relative to a valve seat surface of the fuel supply port in a state in which a valve body portion of the fuel supply valve abuts against the valve seat surface, and has an outer diameter greater than an outer diameter of the valve stem.

According to the hydrogen engine as defined in the above (9), the fuel gas flow from the fuel supply port to the exhaust port side can be suppressed by the collar portion. Therefore, with the simple configuration, it is possible to achieve the effect as defined in the above (8).

(10) In some embodiments, in the hydrogen engine as defined in the above (8), the cylinder head includes: a cylinder head body (such as the above-described cylinder head body 52); a valve seat member (such as the above-described valve seat member 56) forming a valve seat surface of the fuel supply port and configured separately from the cylinder head body; and a mask plate (such as the above-described mask plate 74) interposed between the cylinder head body and the valve seat member, the mask plate includes a protruding portion (such as the above-described protruding portion 76) protruding from a flow passage wall of the fuel supply port toward a valve stem of the fuel supply valve, and the cover portion is the protruding portion.

According to the hydrogen engine as defined in the above (10), the fuel gas flow from the fuel supply port to the exhaust port side can be suppressed by the protruding portion of the mask plate. Therefore, with the simple configuration, it is possible to achieve the effect as defined in the above (8). Further, compared to the configuration of the above (9), by reducing the weight of the fuel supply valve, it is possible to improve responsiveness of the fuel supply valve and to facilitate manufacture or quality control of the fuel supply valve. Furthermore, since the fuel gas is less likely to be supplied to the exhaust port side regardless of the lift amount of the fuel supply valve, a fuel distribution within the cylinder becomes such that the fuel concentration is high on the intake side and the fuel concentration is low on the exhaust side. Thus, since the intake side burns before the exhaust side, it is possible to suppress knocking (if the fuel concentration is uniform, since the exhaust side having the high temperature burns first and the intake side burns over time, the end gas left on the low-temperature wall surface on the intake side self-ignites finally, causing knocking).

(11) In some embodiments, in the hydrogen engine as defined in the above (8), the cylinder head includes: a cylinder head body (such as the above-described cylinder head body 52); and a valve seat member (such as the above-described valve seat member 56) forming a valve seat surface of the fuel supply port and configured separately from the cylinder head body, the valve seat member includes a protruding portion (such as the above-described protruding portion 77) protruding from a flow passage wall of the fuel supply port toward a valve stem of the fuel supply valve, and the cover portion is the protruding portion.

According to the hydrogen engine as defined in the above (11), the fuel gas flow from the fuel supply port to the exhaust port side can be suppressed by the protruding portion of the valve seat member. Therefore, with the simple configuration, it is possible to achieve the effect as defined in the above (8). Further, compared to the configuration of the above (9), by reducing the weight of the fuel supply valve, it is possible to improve responsiveness of the fuel supply valve and to facilitate manufacture or quality control of the fuel supply valve. Furthermore, since the fuel gas is less likely to be supplied to the exhaust port side regardless of the lift amount of the fuel supply valve, the fuel distribution within the cylinder becomes such that the fuel concentration is high on the intake side and the fuel concentration is low on the exhaust side. Thus, since the intake side burns before the exhaust side, it is possible to suppress knocking (if the fuel concentration is uniform, since the exhaust side having the high temperature burns first and the intake side burns over time, the end gas left on the low-temperature wall surface on the intake side self-ignites finally, causing knocking). Further, the number of parts can be reduced as compared to the above configuration (10).

(12) In some embodiments, in the hydrogen engine as defined in any of the above (8) to (11), where a strength S of a swirling flow of intake air flowing into the combustion chamber from the intake port is a dimensionless number indicating how many times the swirling flow rotates about the combustion chamber during one rotation of the engine, an angular width OL is a width of a crank angle, which corresponds to, of one combustion cycle of the engine, a period of overlap between a valve opening period of an exhaust valve of the engine and a valve opening period of the fuel supply valve, and an angle θ is a product of the strength S of the swirling flow and the angular width OL, and where S1 is a range on a side of the exhaust port and S2 is a range of the angle θ from an upstream end in a rotational direction of the swirling flow in the range S1 to an upstream side in the rotational direction of the swirling flow, in a circumferential direction around an axis of the fuel supply valve, the cover portion is disposed in a range including the range S1 and the range S2 in the circumferential direction.

According to the hydrogen engine as defined in the above (12), in consideration of the strength S of the swirling flow of the intake air flowing into the combustion chamber, it is possible to effectively suppress slip out of the fuel gas from the fuel supply port to the exhaust port side in the valve opening period of the exhaust valve.

(13) A hydrogen engine according to at least one embodiment of the present disclosure is a hydrogen engine (such as the above-described hydrogen engine 2) using fuel gas containing hydrogen, including: a cylinder (such as the above-described cylinder 4); a piston (such as the above-described piston 6) movable within the cylinder; a cylinder head (such as the above-described cylinder head 8) forming a combustion chamber (such as the above-described combustion chamber 20) with the piston, and including an intake port (such as the above-described intake port 22) connected to the combustion chamber, a fuel supply port (such as the above-described fuel supply port 26) connected to the combustion chamber, and an exhaust port (such as the above-described exhaust port 24) connected to the combustion chamber; an intake valve (such as the above-described intake valve 10) for opening and closing the intake port; a fuel supply valve (such as the above-described fuel supply valve 15) for opening and closing the fuel supply port; and a valve train (such as the above-described valve train 18) commonly provided for the intake valve and the fuel supply valve, and configured to open and close the intake valve and the fuel supply valve in conjunction with each other. A lower surface of the cylinder head is formed along a plane. A lower surface (such as the above-described lower surface 66) of the fuel supply valve is located upstream of a flow of the fuel gas in an axial direction of the fuel supply valve relative to the lower surface (such as the above-described lower surface 9) of the cylinder head, in a state in which the fuel supply valve abuts against a valve seat surface disposed in the fuel supply port.

According to the hydrogen engine as defined in the above (13), since the lower surface of the fuel supply valve is located upstream of the flow of the fuel gas relative to the lower surface of the cylinder head in the state in which the fuel supply valve abuts against the valve seat surface disposed in the fuel supply port, a time from when the fuel supply valve opens until the fuel gas reaches an exhaust valve position can be longer than in the case where the lower surface of the fuel supply valve is located downstream of the flow of the fuel gas relative to the lower surface of the cylinder head. Therefore, even if there is the period of overlap between the valve opening period of the intake valve and the valve opening period of the exhaust valve, it is possible to suppress discharge of a part of the fuel gas supplied from the fuel supply port to the combustion chamber from the exhaust port without being burned. Thus, it is possible to suppress the decrease in engine efficiency, and to implement the highly efficient hydrogen engine.

(14) In some embodiments, in the hydrogen engine as defined in the above (13), H3>L is satisfied, where L is a lift amount of the fuel supply valve at a valve closing timing of an exhaust valve of the engine and H3 is a distance between the lower surface of the fuel supply valve and the lower surface of the cylinder head in the axial direction of the fuel supply valve in the state in which the fuel supply valve abuts against the valve seat surface disposed in the fuel supply port.

According to the hydrogen engine as defined in the above (14), since H3>L is satisfied, the valve opening timing of the fuel supply valve can be more retarded than the valve closing timing of the exhaust valve. Therefore, it is possible to effectively suppress discharge of a part of the fuel gas supplied from the fuel supply port to the combustion chamber from the exhaust port without being burned.

REFERENCE SIGNS LIST

2 Hydrogen engine
4 Cylinder
6 Piston
8 Cylinder head
9 Lower surface
10 Intake valve
12, 16 Valve spring
14 Exhaust valve
15 Fuel supply valve
18 Valve train
20 Combustion chamber
22 Intake port
24 Exhaust port
26 Fuel supply port
28, 34 Valve stem
30, 36 Valve body portion
32, 38 Force receiving portion
40 Intake camshaft
41 Intake cam
42 Push rod
44 Intake rocker arm
44a One end portion
44b Another end portion
46 Rocker arm shaft
48 Fuel supply valve arm
48a Tip portion
50, 72 Collar portion
52 Cylinder head body
53 Inclined surface (outer peripheral surface)
54 Valve seat surface
56 Valve seat member
60 First flow passage portion
62 Second flow passage portion
63 Opening end
64, 75 Flow passage wall
65 Step
66 Lower surface
70 Outlet portion
74 Mask plate
76, 77 Protruding portion

The invention claimed is:

1. A hydrogen engine using fuel gas containing hydrogen, comprising:
a cylinder;
a piston movable within the cylinder;
a cylinder head forming a combustion chamber with the piston, and including an intake port connected to the combustion chamber and a fuel supply port connected to the combustion chamber;
an intake valve for opening and closing the intake port;
a fuel supply valve for opening and closing the fuel supply port; and
a valve train commonly provided for the intake valve and the fuel supply valve, and configured to open and close the intake valve and the fuel supply valve in conjunction with each other,
wherein the hydrogen engine is configured such that a valve opening timing of the fuel supply valve is more retarded than a valve opening timing of the intake valve.

2. The hydrogen engine according to claim 1,
wherein the valve train includes:
an intake rocker arm configured to rotate around a predetermined rotational axis and to press the intake valve; and
a fuel supply valve arm configured to rotate around the rotational axis together with the intake rocker arm and to press the fuel supply valve, and
wherein a maximum value of a distance between the fuel supply valve arm and the fuel supply valve in one combustion cycle of the engine is greater than a maximum value of a distance between the intake rocker arm and the intake valve in the one combustion cycle of the engine.

3. The hydrogen engine according to claim 2,
wherein the distance between the fuel supply valve arm and the fuel supply valve at a valve closing timing of an exhaust valve of the engine is greater than 0.

4. The hydrogen engine according to claim 1,
wherein the fuel supply valve includes:
a valve stem;
a valve body portion disposed on one end side of the valve stem and abuttable against a valve seat surface of the fuel supply port in an axial direction of the valve stem; and
a collar portion disposed between the valve stem and the valve body portion, and located upstream of a flow of the fuel gas in an axial direction of the fuel supply valve relative to the valve seat surface of the fuel supply port in a state in which the valve body portion abuts against the valve seat surface.

5. The hydrogen engine according to claim 4,
wherein H1>0.7L is satisfied, where L is a lift amount of the fuel supply valve at a valve closing timing of an exhaust valve of the engine and H1 is a height of the collar portion.

6. The hydrogen engine according to claim 1,
wherein the fuel supply port includes:
 a first flow passage portion disposed along an axial direction of the fuel supply valve;
 a valve seat surface disposed downstream of the first flow passage portion; and
 a second flow passage portion disposed downstream of the valve seat surface and having a flow passage width greater than a flow passage width of the first flow passage portion, and
wherein an outer peripheral surface of a valve body portion of the fuel supply valve is configured to slide on a flow passage wall of the second flow passage portion.

7. The hydrogen engine according to claim 6,
wherein H2>0.7L is satisfied, where L is a lift amount of the fuel supply valve at a valve closing timing of an exhaust valve of the engine and H2 is a length of the second flow passage portion in an axial direction of the fuel supply valve.

8. A hydrogen engine using fuel gas containing hydrogen, comprising:
 a cylinder;
 a piston movable within the cylinder;
 a cylinder head forming a combustion chamber with the piston, and including an intake port connected to the combustion chamber, a fuel supply port connected to the combustion chamber, and an exhaust port connected to the combustion chamber;
 an intake valve for opening and closing the intake port;
 a fuel supply valve for opening and closing the fuel supply port;
 a valve train commonly provided for the intake valve and the fuel supply valve, and configured to open and close the intake valve and the fuel supply valve in conjunction with each other; and
 a cover portion configured to cover at least a part of an outlet portion of the fuel supply port on a side of the exhaust port in at least a part of a valve opening period of the fuel supply valve.

9. The hydrogen engine according to claim 8,
wherein the cover portion is a collar portion disposed between a valve stem of the fuel supply valve and a valve body portion, and
wherein the collar portion is formed in a disk or columnar shape, is located upstream of a flow of the fuel gas in an axial direction of the fuel supply valve relative to a valve seat surface of the fuel supply port in a state in which a valve body portion of the fuel supply valve abuts against the valve seat surface, and has an outer diameter greater than an outer diameter of the valve stem.

10. The hydrogen engine according to claim 8,
wherein the cylinder head includes:
 a cylinder head body;
 a valve seat member forming a valve seat surface of the fuel supply port and configured separately from the cylinder head body; and
 a mask plate interposed between the cylinder head body and the valve seat member,
wherein the mask plate includes a protruding portion protruding from a flow passage wall of the fuel supply port toward a valve stem of the fuel supply valve, and
wherein the cover portion is the protruding portion.

11. The hydrogen engine according to claim 8,
wherein the cylinder head includes:
 a cylinder head body; and
 a valve seat member forming a valve seat surface of the fuel supply port and configured separately from the cylinder head body,
wherein the valve seat member includes a protruding portion protruding from a flow passage wall of the fuel supply port toward a valve stem of the fuel supply valve, and
wherein the cover portion is the protruding portion.

12. The hydrogen engine according to claim 8,
wherein, where a strength S of a swirling flow of intake air flowing into the combustion chamber from the intake port is a dimensionless number indicating how many times the swirling flow rotates about the combustion chamber during one rotation of the engine, an angular width OL is a width of a crank angle, which corresponds to, of one combustion cycle of the engine, a period of overlap between a valve opening period of an exhaust valve of the engine and a valve opening period of the fuel supply valve, and an angle θ is a product of the strength S of the swirling flow and the angular width OL, and
where S1 is a range on a side of the exhaust port and S2 is a range of the angle θ from an upstream end in a rotational direction of the swirling flow in the range S1 to an upstream side in the rotational direction of the swirling flow, in a circumferential direction around an axis of the fuel supply valve,
the cover portion is disposed in a range including the range S1 and the range S2 in the circumferential direction.

13. A hydrogen engine using fuel gas containing hydrogen, comprising:
 a cylinder;
 a piston movable within the cylinder;
 a cylinder head forming a combustion chamber with the piston, and including an intake port connected to the combustion chamber, a fuel supply port connected to the combustion chamber, and an exhaust port connected to the combustion chamber;
 an intake valve for opening and closing the intake port;
 a fuel supply valve for opening and closing the fuel supply port; and
 a valve train commonly provided for the intake valve and the fuel supply valve, and configured to open and close the intake valve and the fuel supply valve in conjunction with each other,
wherein a lower surface of the cylinder head is formed along a plane, and
wherein a lower surface of the fuel supply valve is located upstream of a flow of the fuel gas in an axial direction of the fuel supply valve relative to the lower surface of the cylinder head, in a state in which the fuel supply valve abuts against a valve seat surface disposed in the fuel supply port.

14. The hydrogen engine according to claim 13, wherein H3>L is satisfied, where L is a lift amount of the fuel supply valve at a valve closing timing of an exhaust valve of the engine and H3 is a distance between the lower surface of the fuel supply valve and the lower surface of the cylinder head in the axial direction of the fuel supply valve in the state in which the fuel supply valve abuts against the valve seat surface disposed in the fuel supply port.

\* \* \* \* \*